US007606782B2

(12) United States Patent
Haley

(10) Patent No.: US 7,606,782 B2
(45) Date of Patent: Oct. 20, 2009

(54) SYSTEM FOR AUTOMATION OF BUSINESS KNOWLEDGE IN NATURAL LANGUAGE USING RETE ALGORITHM

(75) Inventor: Paul Haley, Sewickley, PA (US)

(73) Assignee: Oracle International Corporation, Redwood Shores, CA (US)

( * ) Notice: Subject to any disclaimer, the term of this patent is extended or adjusted under 35 U.S.C. 154(b) by 201 days.

(21) Appl. No.: 10/296,114

(22) PCT Filed: May 24, 2001

(86) PCT No.: PCT/US01/17072

§ 371 (c)(1),
(2), (4) Date: May 23, 2003

(87) PCT Pub. No.: WO01/90924

PCT Pub. Date: Nov. 29, 2001

(65) Prior Publication Data

US 2004/0030421 A1  Feb. 12, 2004

Related U.S. Application Data

(60) Provisional application No. 60/241,380, filed on Oct. 18, 2000, provisional application No. 60/206,742, filed on May 24, 2000.

(51) Int. Cl.
*G06N 5/02* (2006.01)
(52) U.S. Cl. .............................. 706/50; 717/108; 704/9
(58) Field of Classification Search .................. 706/50; 717/106, 107, 108; 704/9
See application file for complete search history.

(56) References Cited

U.S. PATENT DOCUMENTS 4,890,240 A  *  12/1989  Loeb et al. ..................... 706/48

(Continued)

FOREIGN PATENT DOCUMENTS

EP  0542430 A  5/1993

OTHER PUBLICATIONS

"Parallel algorithms and architectures for rule-based systems", ACM SIGARCH Computer Architecture News, vol. 14, Issue 2 (Jun. 1986), pp. 28-37.*

(Continued)

*Primary Examiner*—David R Vincent
*Assistant Examiner*—Mai T Tran
(74) *Attorney, Agent, or Firm*—Townsend and Townsend and Crew LLP

(57) ABSTRACT

The present invention is directed to a system for managing business knowledge expressed as statements, preferably sentences using a vocabulary, where such statements may be automated by the generation of programming language source code or computer program instructions. As such, the present invention also manages software design specifications that define, describe, or constrain the programming code it generates or programs with which it or the code it generates is to integrate. All information managed within the present invention is maintained within a relational database that is encapsulated within an object-oriented model. Each object in this model is subject to version control and administration using permissions. Each user of the system is an object and belongs to one or more groups. Users and groups may be granted privileges. Objects may be created, examined, used, modified, deleted, or otherwise operated upon only if corresponding permission or privilege has been granted. The vocabulary managed by the present invention consists of the function words commonly used in a language, such as the auxiliary verbs, prepositions, articles, conjunctions, and other essentially closed parts of speech in English, as well as open parts of speech, such as nouns, verbs, adjectives, and adverbs.

33 Claims, 17 Drawing Sheets

U.S. PATENT DOCUMENTS

| | | | | |
|---|---|---|---|---|
| 5,167,009 | A | * | 11/1992 | Skeirik .................... 706/23 |
| 5,295,256 | A | * | 3/1994 | Bapat ..................... 717/137 |
| 5,297,239 | A | * | 3/1994 | Kurosawa et al. .......... 706/59 |
| 5,398,304 | A | * | 3/1995 | Bauman et al. ............ 706/45 |
| 5,418,888 | A | * | 5/1995 | Alden ...................... 706/48 |
| 5,418,943 | A | * | 5/1995 | Borgida et al. ............. 707/4 |
| 5,471,611 | A | * | 11/1995 | McGregor ................ 707/4 |
| 5,555,408 | A | * | 9/1996 | Fujisawa et al. ............ 707/5 |
| 5,615,112 | A | * | 3/1997 | Liu Sheng et al. ...... 707/104.1 |
| 5,644,686 | A | * | 7/1997 | Hekmatpour .............. 706/45 |
| 5,659,724 | A | * | 8/1997 | Borgida et al. ............. 706/50 |
| 5,806,056 | A | * | 9/1998 | Hekmatpour .............. 706/50 |
| 5,970,482 | A | * | 10/1999 | Pham et al. ................ 706/16 |
| 6,415,275 | B1 | * | 7/2002 | Zahn ....................... 706/47 |
| 6,535,864 | B1 | * | 3/2003 | Zahn ....................... 706/47 |
| 6,745,382 | B1 | * | 6/2004 | Zothner ................... 717/107 |
| 6,868,413 | B1 | * | 3/2005 | Grindrod et al. ........... 706/59 |
| 7,197,739 | B2 | * | 3/2007 | Preston et al. ............ 717/106 |

OTHER PUBLICATIONS

"An initial report on the design of Ariel: a DBMS with an integrated production rule system", Eric N. Hanson, SIGMOD Record, vol. 18, No. 3, Sep. 1989.*

"CL: A flexible and efficient tool for constructing Knowledge-based expert systems", Watanabe, M.; Yamanouchi, T.; Iwamoto, M.; Ushioda, Y.; Expert, IEEE [see also IEEE Intelligent Systems and Their Applications] vol. 4, Issue 3, Fall 1989 pp. 41-50.*

"Event identification based on the information map-INFOMAP", Wen-Lian Hsu, Shih-Hung Wu, Yi-Shiou Chen, Systems, Man, and Cybernetics, 2001 IEEE International Conference, Publication date 2001, vol. 3, pp. 1661-1666.*

"Rete: A Fast Algorithm for the many pattern/many object pattern match problem", Artificial Intelligence, vol. 19, No. 1, 1982, pp. 17-37.*

Supplementary European Search Report for European Patent Application No. 01939495; dated Jun. 15, 2007.

T. Wang, et al., "Active Rule Processing in the Biocompose Database," Proceedings International Symposium on Object-Oriented Real-Time Distributed Computing, Apr. 1998, pp. 431-437.

E. N. Hanson, "An Initial Report on the Design of Ariel: A DBMS with an Integrated Production Rule System," Sigmod Record, New York, NY; vol. 18, No. 3; Sep. 1, 1989, pp. 12-19.

* cited by examiner

Add a new attribute to the browser template

Attribute: _____

Is type: [integer] [Select ...]

That
- ◉ is an intrinsic property or trait of this template
- ○ is a unique name or identifier of this template    Position in key: [0]
- ○ refers to: _____ [Select ...]

☐ must have a value for every instance or fact of this template
☐ has a fixed set of possible values (i.e., is nominal)

Data Type
[Implementation...] _____

Get Method: _____ [Select ...]
Set Method: _____ [Select ...]

Default value
☐ Attribute has default
[0]

[OK]
[Cancel]

FIG. 12

SYSTEM FOR AUTOMATION OF BUSINESS KNOWLEDGE IN NATURAL LANGUAGE USING RETE ALGORITHM

CROSS-REFERENCE TO RELATED APPLICATION

This application is the national stage entry of international application PCT/US01/17072, filed on May 24, 2001, which in turn claims priority to U.S. Provisional Patent Application Ser. No. 60/206,742, having a filing date of May 24, 2000, and U.S. Provisional Patent Application Ser. No. 60/241,380, having a filing date of Oct. 18, 2000.

STATEMENT REGARDING FEDERALLY SPONSORED RESEARCH

Not applicable.

REFERENCE TO MICROFICHE APPENDIX

Not applicable.

BACKGROUND OF THE INVENTION

1. Field of the Invention

The present invention relates to a system for knowledge management and automation. More particularly, the invention relates to a system for knowledge management using natural language sentences, and even more particularly to a computer software system for knowledge management using natural language sentences that state the facts and imperatives that define how an entity behaves or operates and what the entity needs to know in order to so behave or operate.

2. Description of the Prior Art

Natural Language Systems. Natural language interfaces to SQL databases have existed for some time. The ability to query a data model using natural language is particularly beneficial to non-technical business personnel who manage operations that produce and/or are affected by the data so queried. Consumers also benefit from the ability to query data models concerning retail products and services, financial data, and other tabular or personal information. The prior art emphasizes the acquisition of a vocabulary of nouns and verbs and how they map to entities and relations in a relational data model. Research efforts and commercial products of the prior art have attempted a variety of approaches to augmenting data models with lexical and syntactic information in an effort to support natural language queries. The prior art does not disclose the translation of knowledge expressed in natural language into operational logic within programs. Moreover, the systems of the prior art are strictly syntactic with very little ability to understand the semantics of natural language. That is, the prior art treats natural language syntactically, not grammatically.

The limits of the prior art in natural language interfaces are demonstrated in products such as Linguistic Technology's English Wizard and Microsoft's English Query. These products have the distinct disadvantage that they do not address the issue of managing knowledge about an underlying object or data model. That is, the systems of the prior art demonstrate only a vocabulary that refers to parts of a model. The systems of the prior art have the distinct disadvantage that they do not have the ability to represent knowledge about a model (e.g., sentences constructed from such vocabularies) or to define knowledge prior to the implementation of a model.

The systems of the prior art have the additional disadvantage that they aim only to provide end users with access to data rather than to manage the definition of a model throughout its life cycle within and across an enterprise. Consequently, if the vocabularies and mappings of these systems are shared, untrained users may incorrectly define or alter mappings from the vocabulary into the model. Any such change, whether or not correct and appropriate, becomes permanent and destructive, without substantial support for version control, user privileges or object permissions.

The systems of the prior art have the additional disadvantage that they parse input from users according to syntactic rules and limited vocabularies. Because users cannot reasonably be fully aware of the restrictions imposed on their grammar by such rules, they are often frustrated when their input is rejected as non-grammatical. In addition, because the syntactic rules and word senses of the vocabulary are typically ambiguous, users are often frustrated when their grammatical input is misinterpreted.

Knowledge Management Systems. The practice of knowledge management involves capturing the information that business personnel need to know and use in the course of doing business. Existing knowledge management systems maintain such information as unstructured text and are primarily concerned with storing and providing access to documents comprised of at least paragraphs, but most typically many pages of content per document. Conventional knowledge management systems are almost never applied to managing documents comprised of at most one sentence.

The sentences within a knowledge management system include statements of fact as well as conditional imperatives. Collectively, such statements of fact and descriptions of behavior define the knowledge that people or computers must know and use in order to perform or support a business function or process. That is, the text stored in the database of a knowledge management system (i.e., a "knowledge base") documents the policies and practices of a business. Such a knowledge base is often administered and shared among the employees may be repeatedly referenced by personnel and can be used by business analysts to produce systems requirements and functional specifications which are subsequently implemented by programmers.

Conventional knowledge management systems have the significant disadvantage that they make no effort to formally acquire, analyze, and understand the lexical, syntactic, and grammatical structure of sentences within the text they manage. Consequently, these knowledge management systems are incapable of reliably translating such sentences between natural languages or into computer software expressed in any programming language.

The limits of the prior art in knowledge management are demonstrated in products from Verity, Fulcrum, and Documentum. These products have the distinct disadvantage that they do not parse, acquire, or validate a document at the level of sentences. Consequently, the prior art is incapable of ensuring that each sentence within the knowledge base is semantically consistent and unambiguous. Therefore, the knowledge documented in the prior art is suitable only for use by people, not for direct translation into computer programs. Moreover, without a semantically consistent and unambiguous understanding of every sentence in a knowledge base, automatic translation between natural languages (e.g., English or Spanish to or from French or German) is unreliable. Consequently, knowledge managed using the prior art requires manual translation in order to be effective within multilingual (e.g., multinational) organizations.

Software Design Methodology. An application of knowledge management involves the collection of business policies and practices, sometimes referred to as requirements and/or specifications for software that is to be developed in support of, for example, business operations. Established software design methodologies have the distinct disadvantage that they distinguish between the requirements and specifications of the business and the software implementation of such requirements and specifications. Systems of the prior art, such as the knowledge management systems listed above and software modeling tools that support software design methodologies (e.g., UML, Universal Modeling Language), such as Rational Software's Rose and Microsoft's Visio, are distinct. Knowledge management systems manage documents and software-modeling tools are distinct. That is, the prior art provides no automatic integration between the business requirements and specifications managed within a knowledge management system and the implementation details managed within a software design tool. Most specifically, the statements made by (i.e., the sentences authored by) the business are not isomorphic to the statements made within most programming language. Consequently, a mapping from business requirements and specifications to source code or vice versa cannot be maintained.

Knowledge management systems of the prior art have no capability to generate software, as discussed above. In addition, software design tools of the prior art have limited software generation capabilities in that they do not incorporate the business policies that are to be reflected within the generated software. Such design tools are limited to generating models into which programmers manually implement code reflecting separately documented business policies. In addition, programmers must manually modify and maintain generated source code when business requirements or specifications change. This manual intervention and implementation results in inordinate delays and poor reliability. Consequently, established software design methodologies suffer from the disadvantages that they emphasize comprehensive yet detailed design before and long cycle times between each version of the resulting software.

Business Process Automation. The natural language query systems of the prior art attempt to perform actions on the state of a database as it exists when the query is specified. Business processes, on the other hand, are defined by policies or practices that are applied whenever they are relevant. Such business polices and practices are typically known as business rules. Established software development methodologies involve the gathering of business rules from operational, managerial, and executive business personnel by so-called business systems analysts. These analysts are the authors of the requirements and specifications documents discussed above. Programmers use the resulting documents to craft software that reflects the business rules documented by the analysts.

To the extent that the work product of programmers is distinct from the work product of analysts, business process automation in the systems of the prior art has the disadvantage of communications overhead and its attendant costs and risks of confusion or ambiguity. This disadvantage also applies to the extent that the work product of the analysts is distinct from the statements or perspective of the operational, managerial, or executive business personnel from whom analysts gather business rules.

Software Development Process. As described above concerning software design methodology, the statements of traditional (i.e., procedural, including object-oriented) programming languages have the distinct disadvantage that they are not isomorphic to the requirements or specifications stated by operational, managerial, or executive business personnel. As discussed above, this disadvantage in design also manifests itself during the development process in that changes in the requirements or specifications cannot be incrementally reflected in source code. That is, changing or introducing a business policy or practice may affect or introduce many programming statements.

The difficulty of producing and maintaining programming statements that remain consistent with business statements concerning policies and practices can be avoided if the business statements are expressed and implemented as business rules. Expressing business policies and practices as independent statements in a rule-based language can maintain the isomorphism between business statements and programming statements. However, in order for the isomorphism to remain between business and programming statements, the business statements must be specified carefully enough that they become directly executable or so that the code which implements those business statements can be automatically generated and, thereafter, executed. In either case, the prior art continues to suffer from the distinct disadvantage that business personnel cannot directly specify statements with the formality required by rule-based programming languages and their engines or code generators.

Production Rule Systems. As described above, in order for business personnel to state business policy, practice, or process specifications such that they remain isomorphic with their implementation expressed as programming statements, it is necessary that those business statements are formally encoded in an unambiguous grammar which is either directly executable or from which executable programming statements can be automatically generated. In addition, the expression of such business statements must not be with regard to any sequence or procedure. That is, business personnel specify how business operates not by being programmers themselves but by dictating how a business is to handle or respond to situations whenever and as they arise. Such specifications may be regulations affecting or policies that state business processes, for example. Each such statement is a rule. If such statements are independent then the collection of such rules is known within artificial intelligence as a production system where each such rule is more precisely a production.

The prior art implements business rules as production rules using either a rule engine or triggers. Triggers may be implemented within object-oriented programming languages such as C++ or Java or using SQL or scripting languages provided by databases such as IBM's DBS, Oracle, or Microsoft's SQL Server. The disadvantage of the prior art concerning triggers is that the resulting implementation is less efficient and scalable than using a rule engine. In addition, the programming code necessary to codify the checking and application of rules and their triggers must be specified by programmers rather than being automatically derived from business requirements and specifications expressed as sentences within a knowledge management system.

The Rete Algorithm. The Rete Algorithm is recognized as the most efficient algorithm for the implementation of the aforementioned production systems. One alternative, the Treat Algorithm, offers competitive performance in limited cases. However, Rete's performance becomes increasingly dominant as the number of rules increases. One of the significant advantages of the Rete Algorithm is that it is the only published algorithm that checks the conditions of a set of rules within an expected period of time that is asymptotically independent of the number of rules. Thus, only the Rete Algorithm scales to thousands of rules. The principal reference for the Rete Algorithm is "Rete: A Fast Algorithm for the Many Pattern/Many Object Pattern Match Problem", Artificial Intelligence, 19, pp 17-37, 1982, hereby incorporated by reference.

The prior art does not relate the rules implemented using the Rete Algorithm (nor rules implemented as triggers, as discussed above) to the sentences managed within a knowledge management system. Moreover, the Rete Algorithm has no intrinsic support for organizing the application of rules within a decision making process nor for coping with logical inconsistencies between statements authored by one or more users of a knowledge management system. Consequently, the prior art is incapable of supporting the resolution of inconsistencies or inadequacies in the collective sentences of a knowledge management system or of auditing the applicability of individual sentences in a knowledge management system. Thus, the prior art does not facilitate the testing, monitoring, or improvement of the knowledge managed.

Source Code/Version Control. The software requirements and specifications documents for software systems that are typically produced by business systems analysts can be subject to version control within a knowledge management system in much the same way that the resulting source code may be managed using a source code version control system. Computer files of any type, including documents as in a knowledge management system, but most typically files of software source code expressed in computer programming languages are commonly managed by version control systems. Products such as Merant's PVCS or Microsoft's Source Safe are typical of the prior art. The prior art typically manages versions of content at the level of document files (including source code files). However, the granularity of version control in the prior art is too coarse for a knowledge management system that manages a vocabulary and sentences expressed using that vocabulary. Consequently, the prior art is unable to manage knowledge that is accumulated incrementally by acquiring and maintaining dictionary definitions of words and sentences that use previously acquired vocabulary with subsequently modifiable dictionary definitions.

The set of statements in a knowledge management system that documents business processes evolves over time. Such statements are formulated and come into effect incrementally and may evolve through multiple versions before expiring. Statements are formulated by an author and may be refined in subsequent versions by various authors who are permitted to affect such statements or who have the privileges need to grant themselves such permissions. The prior art has no effective ability to manage versions of statements at such a level of granularity, particularly where certain words in the vocabulary used within such statements may be restricted to certain authors or groups of authors and where words in the vocabulary are related to implementation details maintained as software model information within the knowledge management system where such software model information is itself subject to version control.

Because adding, removing, or changing a statement usually has some actual impact on a business, the ability to modify the repository of statements affecting business should be administered. Because business people have various responsibilities and capabilities, operations on the repository of statements should be controlled by the administration of privileges, which may be assigned to users or groups of users. Because individual statements may have varying degrees of maturity or certification, operations on statements should be controlled by administration of permissions that may be granted to users or groups of users for a statement or a set of related statements. However, all the forgoing is beyond the current state of the art in knowledge management and source code control systems.

Speech Recognition. Speech recognition systems recognize either continuous speech where words are expressed naturally without intervening pauses or as isolated words. Isolated word recognition is awkward other than for very limited purposes and is becoming less relevant as the quality of continuous speech recognition systems increases. The prior art in continuous speech recognition provides accurate recognition by balancing restrictions on grammar with restrictions on vocabulary, one of which must be fairly constraining in order for speech recognition performance to be acceptable. Grammars in the prior art are either probabilistic word sequence models or context free syntactic specifications. Probabilistic word sequence models do not ensure syntactically correct recognition, however, and neither approach can ensure that what is recognized is semantically clear and unambiguous. Consequently, the prior art is incapable of the natural language processing required in order to capture grammatically correct and unambiguous knowledge.

SUMMARY OF THE INVENTION

The present invention is directed to a system for managing business knowledge expressed as statements, preferably sentences using a vocabulary, where such statements may be automated by the generation of programming language source code or computer program instructions. As such, the present invention also manages software design specifications that define, describe, or constrain the programming code it generates or programs with which it or the code it generates is to integrate.

All information managed within the present invention may be maintained within a relational database that is encapsulated within an object-oriented model. Each object in this model is subject to version control and administration using permissions. Each user of the system is an object and belongs to one or more groups. Users and groups may be granted privileges. Objects may be created, examined, used, modified, deleted, or otherwise operated upon only if corresponding permission or privilege has been granted.

The vocabulary managed by the present invention consists of the function words commonly used in a language, such as the auxiliary verbs, prepositions, articles, conjunctions, and other essentially closed parts of speech in English, as well as open parts of speech, such as nouns, verbs, adjectives, and adverbs.

The software design managed by the present invention subsumes procedural, object-oriented or relational software design models such as those that may be expressed in Universal Modeling Language (UML) or Object Role Modeling (ORM), including procedural interfaces including actions that may have side effects as well as applicative functions and predicates. Software design information may be acquired through graphical user interfaces provided by the present invention or as may be imported by the present invention from external sources such as eXtensible Markup Language (XML) Document Type Definition (DTD) or schema files, UML files or repositories, or through introspection or reflection capabilities supported for Java, Component Object Model (COM), Common Object Broker Request Architecture (CORBA), SQL databases, and other sources. The use of these system allows the present invention to represent the business or other information as at least one statement comprising at least one relationship, where the relationship instantiates a relation having at least one role and an indefinite concept filling the role. This is in sharp contrast to the systems of the prior art, which are only capable of utilizing definite concepts in this manner.

The present invention does not require a pre-existing software design nor does it require a complete software design that is to be generated or implemented in the future. Thus, the present invention allows for the specification of grammatical sentences without implementation detail. The nouns within these statements may be defined as external data which may be further described as a type of data or piece or aggregation of data, such as a relational database column or table or an attribute or class of an object, respectively. The verbs within statements may be defined externally either declaratively, as in a database relation, or procedurally, as in a method or member function of an object-oriented class. However, nothing in the present invention requires external implementation details to exist for nouns or verbs before they may be used in sentences. In this manner, the present invention distinguishes between the semantics of nouns and the verbs that relate them in sentences from the implementation details that may subsequently be defined or modified.

The sentences managed by the present invention are represented by their semantic content rather than their syntactic specification or resulting implementation. Consequently, the knowledge expressed within sentences is managed without ongoing need or reference to—hence independently of—lexical, syntactic, or implementation details. The syntax of their specification can be presented, however, as can alternative expressions within their source or alternative natural languages, such between English, French, German, or Spanish, for example.

The sentences managed by the present invention may be acquired programmatically using its object model, by loading sentences from a file of text or XML, or through an interactive user interface which supports menu, keyboard, and voice input. In any case, the present invention ensures that any acquired sentence uses only defined vocabulary, is syntactically valid, and can be represented semantically without ambiguity.

The user interface provided by the present invention facilitates productive use without prior training or familiarity with the limited English vocabulary and syntax supported using continuous or word-by-word authoring with the keyboard, mouse, or voice. At any point the user interface presents a visual image of what words or types of data (e.g., numbers) may come next. At any point the user is free to use keyboard input, mouse clicks or drag operations, or voice input. Whenever a valid sentence has been specified it can be completed and prior words can be erased or undone at any time.

The present invention allows multiple users to view, edit, and contribute knowledge simultaneously. In addition, the present invention includes administrative facilities to designate users (or groups of users) who are to have permission to perform operations on various types of objects as well as which users have privileges to perform certain operations without regard to permissions. Furthermore, the present invention keeps track of version information for all permitted operations, including author, annotation, and time stamp tracking.

The present invention has the capability to present or generate reports or programming code or instructions for the versions of statements, vocabulary, and software design information as they existed at any specified point in time. As a result, the present invention can report activities or changes over time and reconstruct or reproduce reports or regenerate programming code from any time. The present invention can also undo recent changes or forget prior changes when convenient.

The present invention can organize statements within a taxonomy of modules and bring those statements to bear under procedural control. In addition, statements may be excluded or overridden under certain conditions. The present invention can generate production rules that implement the statements organized within a taxonomy of modules with such exclusions and overrides and subject to procedural control in a manner that can be audited.

The present invention can test the impact of sentences by generating production rules and applying those rules to test cases using audit facilities and reporting the statements that are or are not applicable to a case. In addition, the present invention can identify statements that become applicable or that are no longer applicable to a test case as the versions of a statement or of all statements within a taxonomy of modules change.

The present invention can automatically import and interactively acquire external implementation or design details and map between the vocabulary used in statements and the external implementation or design such that the present invention can generate programming code that integrates with external systems such as relational databases or object-oriented programs.

BRIEF DESCRIPTION OF THE DRAWINGS

FIGS. 8(a)-(b) are computer screen shots for specifying a declarative relation in accordance with the system of the present invention.

FIG. 12 is a computer screen shot illustrating the use of templates in accordance with the system of the present invention.

DETAILED DESCRIPTION OF THE PREFERRED EMBODIMENT

Figure 1:
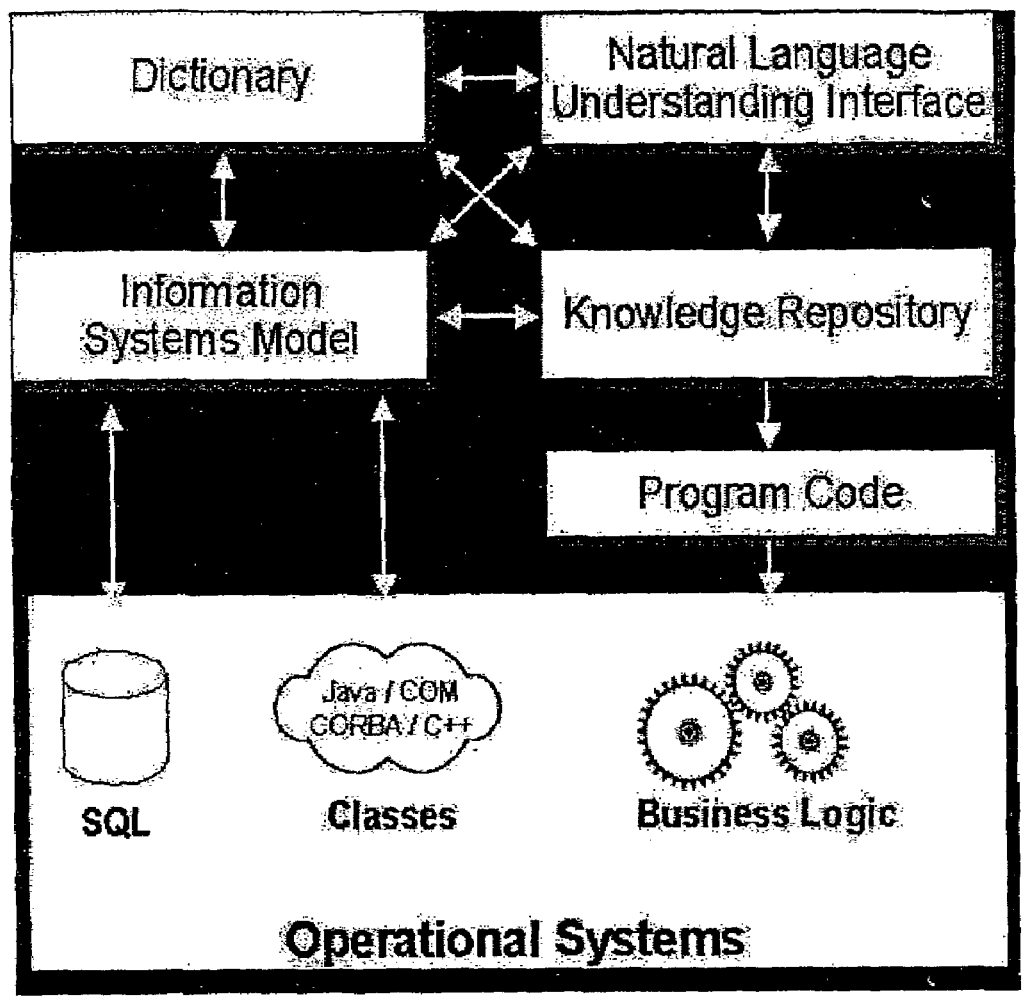
FIG. 1 is a diagram of the preferred embodiment of the components of a computer software system in accordance with the present invention.

It will be appreciated that the following description is intended to refer to the specific embodiments of the invention selected for illustration in the drawings and is not intended to define or limit the invention, other than in the appended claims.

The present invention advances the state of the art individually and collectively among the areas of natural language interfaces, knowledge management, software design methodology, business process automation, software development process, production rule systems, relational database systems, object-oriented programming, spoken language interaction, and automatic translation.

The present invention is directed to a knowledge management system that allows non-technical business personnel to express knowledge that is to be managed and possibly automated using natural language sentences.

An illustration of a preferred embodiment of the present invention, as embodied in a computer software application, is shown in FIG. 1. As shown in FIG. 1, the knowledge management and automation system of the present invention may include a natural language understanding interface, which allows users to author, review, and edit sentences that are stored in knowledge repository using the natural language vocabulary of dictionary, which is also stored in the knowledge repository and which may refer to an information systems model that specifies design information about various operational systems, all in accordance with the system of the present invention as described herein. Given an information systems model for targeted operational systems, the present invention can generate program code that operates with or within the various operational systems in order to implement the sentences (whether interactive questions, immediate imperative commands, or conditional business rules) specified using the natural language understanding interface.

Sentences are acquired through the natural language interface using the vocabulary maintained in the dictionary that may be mapped to an information systems model mapped from an SQL database or Java object model (or other sources), all of which are maintained in a knowledge repository from which the present invention can generate procedural and/or rule-based code that executes as business logic that integrates with external object models and/or databases.

Figure 2:
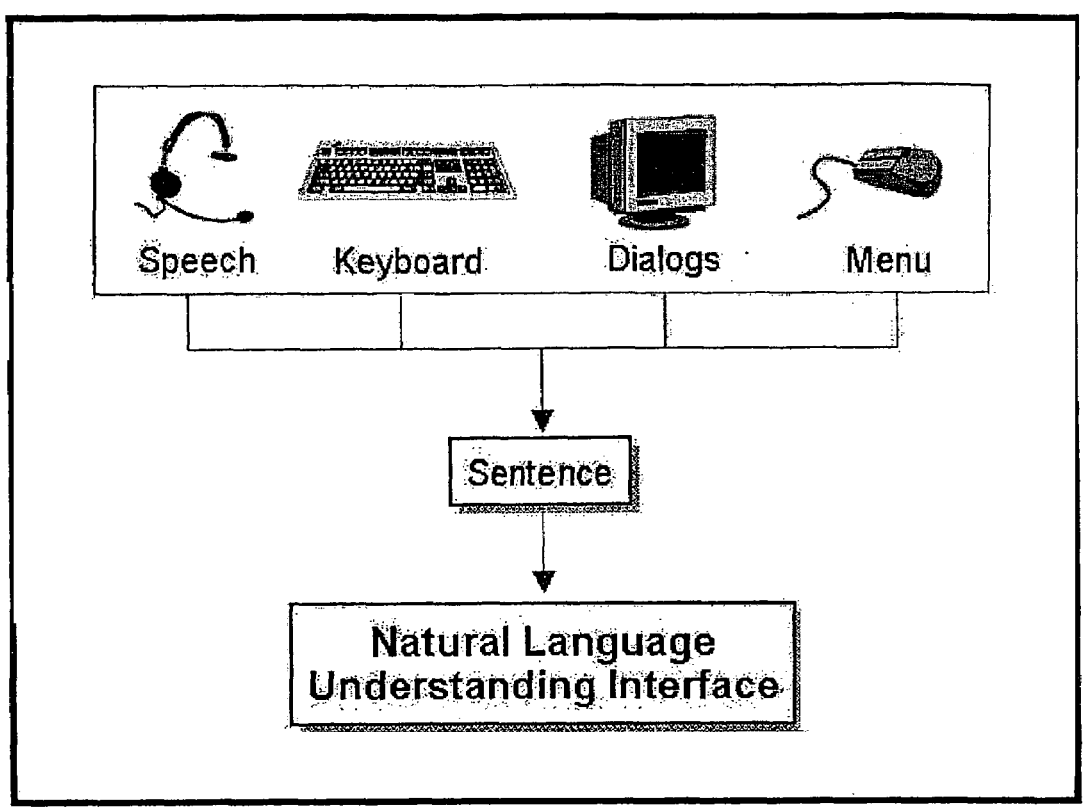
FIG. 2 is a diagram illustrating the natural language understanding interface of the present invention.

The natural language understanding interface preferably includes a graphical user interface (GUI), but is not limited thereto and could also be strictly textual or spoken language in nature, each and all of which are provided in the present invention, all of which together constitute a preferred embodiment, as show in FIG. 2.

With regard to interaction, the knowledge acquisition system of the present invention preferably guides untrained users in making grammatically correct and unambiguous sentences by various methods and using various interfaces, such as by displaying all grammatically correct words that may come next within a list of words, or within a list of menu options; or by display grammatically correct noun words that may come next within an taxonomy.

The knowledge acquisition system of the present invention may also preferably guide untrained users by displaying grammatically correct words that may come next using waterfall and/or cascading menus in a manner that avoids computing all grammatically correct sentences (i.e., a computationally expensive or intractable problem), or that prunes words that may come next but given which no grammatically complete sentence exists (especially in real-time without requiring the pre-computation of all grammatically correct sentences beforehand).

Figure 3:
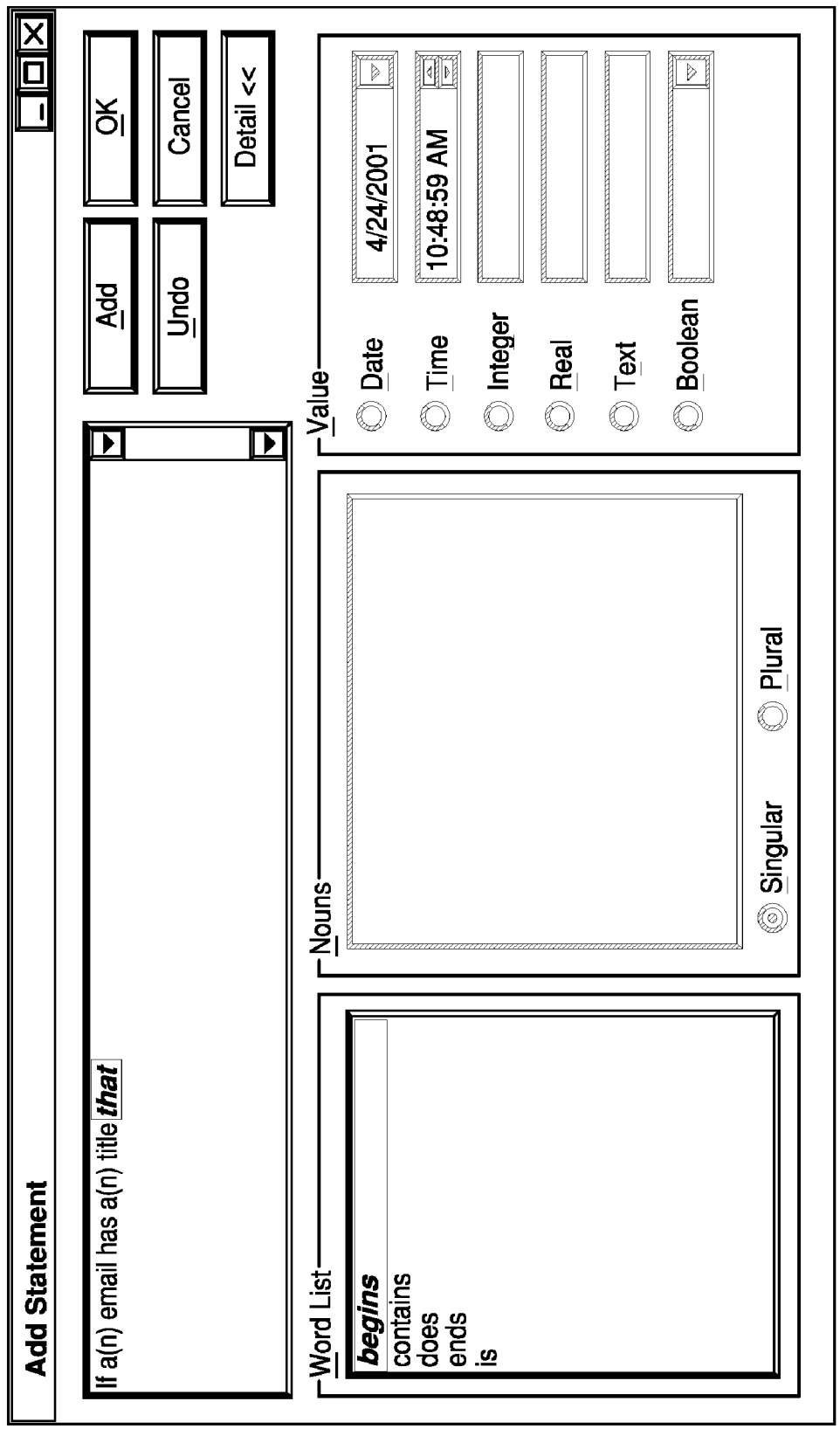
FIG. 3 is a computer screen shot of a preferred embodiment of a dialog box for adding a statement in accordance with the present invention.

It may also guide users by displaying user interface controls that facilitate the entry of numbers, dates, strings, etc.; or by presenting a button, period, or other display to indicate that the words expressed thus far constitute a grammatically correct sentence; or by integrating with speech recognition systems so as to accept syntactically correct input but to limit recognized speech to grammatically correct sentences as might be input using the dialog, controls, and menus described above; or by integrating with speech recognition systems so as to accept words presented by the dialog and menus described above; or by integrating with speech recognition systems so as to accept input to the number, date, time, and string controls described above. The preferred embodiment of the present invention allows a user to switch freely between any mode of input, such as typing, pointing and clicking, dragging, or speaking in the course of authoring or editing a sentence. Moreover, the preferred embodiment can provide guidance to the user by displaying or suggesting words that could occur next by predicting possible inputs, including inputs that could complete a word being typed in using a keyboard. An example of such and input is shown in FIG. 3.

Figure 4:
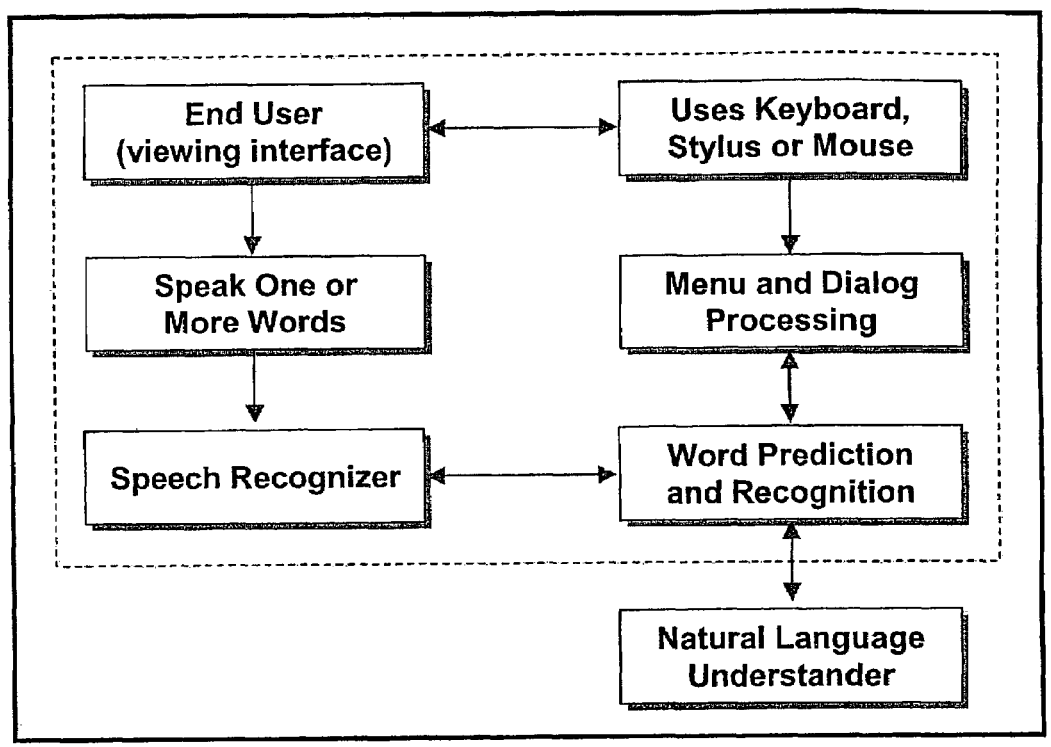
FIG. 4 is a diagram illustrating the manner of inputting information in accordance with the system of the present invention.

The system of the present invention provides the preceding dialog by which it allows input by keyboard, mouse, or speech input at any time in accordance with diagram shown in FIG. 4. Note that the dialog shown in FIG. 3 also allows for input to be erased or "undone" and that input cannot be accepted unless it constitutes a grammatical sentence (i.e., the "OK" button is disabled otherwise.)

Figure 5:
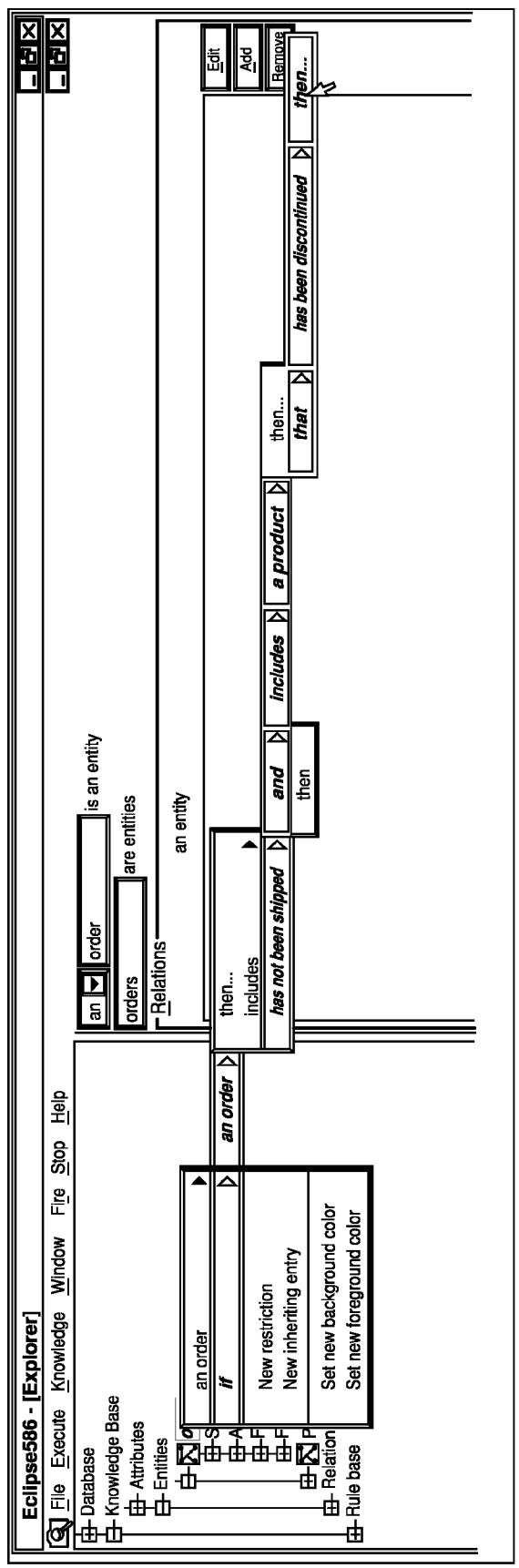
FIG. 5 is a computer screen shot of a preferred embodiment of the cascading menus of the system of the present invention.

The preferred embodiment also allows a user to quickly examine alternative multi-word continuations of a sentence and to author a sentence by simply dragging a pointer, as illustrated in FIG. 5, which shows a cascading menu that may be navigated forward and backward by clicking or simply dragging the pointer. This technique has the significant advantage over the prior art that it more productively assists and guides users to syntactically correct and complete as well as semantically clear unambiguous sentences without prior training in or experience with the grammar and vocabulary available to the user (e.g., English with words grounded in a particular data model.)

The preferred embodiment also allows a user to use continuous speech recognition capabilities and the resulting recognition improvements that a closed vocabulary and restricted grammar yield given the current state of the art in speech. It is preferred to have fairly unrestricted grammar with a potentially large vocabulary. However, the current art in speech recognition performs poorly given an unrestricted grammar and a large vocabulary.

The current art in speech recognition has limited ability to constrain grammar. Commercial speech recognition engines such as IBM's Via Voice and Dragon's Dictate and others that implement Microsoft's Speech Applications Programming Interface (SAPI), for example, accept only a context free grammar specification. The context free grammar specification of the prior art cannot reflect the semantic constraints understood by the present invention, however. An example of the grammar that may be used in the present invention is shown below in context free form:

```
<action> : := <intransitiveImperative>
<action> : := <subjectPhrase> <objectPhrase>
<action> : := <verbTerminal> <complements>
<action> : := <verbTerminal> <nounPhrase>
<action> : := <verbTerminal> <nounPhrase> <complements>
<action> : := <verbTerminal> <nounPhrase> <nounPhrase>
<action> : := <verbTerminal> <nounPhrase> <nounPhrase> <complements>
<action> : := <verbTerminal> <nounPhrase> <prepositionalPhrase>
<action> : := <verbTerminal> <nounPhrase> <prepositionalPhrase> <complements>
<actions> : := <action>
<actions> : := <action> and <actions>
<binaryFunction> : :==
<complements> : := <prepositionalPhrase>
<complements> : := <prepositionalPhrase> <prepositionalPhrase>
<complements> : := <prepositionalPhrase> <prepositionalPhrase> <prepositionalPhrase>
<complements> : := <prepositionalPhrase> <prepositionalPhrase> <prepositionalPhrase>
    <prepositionalPhrase>
<complements> : := <prepositionalPhrase> <prepositionalPhrase> <prepositionalPhrase> and
    <prepositionalPhrase>
<complements> : := <prepositionalPhrase> <prepositionalPhrase> and <prepositionalPhrase>
<complements> : := <prepositionalPhrase> <prepositionalPhrase> and <prepositionalPhrase>
    <prepositionalPhrase>
<complements> : := <prepositionalPhrase> and <prepositionalPhrase>
<complements> : := <prepositionalPhrase> and <prepositionalPhrase> <prepositionalPhrase>
<complements> : := <prepositionalPhrase> and <prepositionalPhrase> <prepositionalPhrase>
    <prepositionalPhrase>
<complements> : := <prepositionalPhrase> and <prepositionalPhrase> <prepositionalPhrase>
    and <prepositionalPhrase>
<copularStatement> : := <nounPhrase> <predicate>
<declarative> : := <copularStatement>
<declarative> : := <subjectPhrase> <objectPhrase>
<declaratives> : := <declarative>
<declaratives> : := <declarative> and <declarative>
<determiner> : := <indefiniteDeterminer>
<determiner> : := the
<directObjectPhrase> : := <nounPhrase>
<indefiniteDeterminer> : :==
<nonTerminalConcept> : := <adjective> <nonTerminalConcept>
<nonTerminalConcept> : := <concept>
<nonTerminalConcept> : := <ordinal> <nonTerminalConcept>
<nonTerminalConceptPhrase> : := <determiner> <nonTerminalConcept>
<nonTerminalConceptPhrase> : :==      <determiner> <nonTerminalConcept> <preposition>
    <nonTerminalConceptPhrase>
<nonTerminalConceptPhrase>
        : := <determiner> <nonTerminalConcept> <verbPhrase> <preposition>
    <nonTerminalConceptPhrase>
<nonTerminalConceptPhrase> : := <indefiniteDeterminer> <nonTerminalConcept>
<nonTerminalConceptPhrase> : := <nonTerminalConcept>
<nonTerminalConceptPhrase> : := <nonTerminalConceptPhrase> <thatClause>
<nonTerminalConceptPhrase> : := <nonTerminalInstance>
<nonTerminalConceptPhrase> : := <nonTerminalInstance> <preposition>
    <nonTerminalConceptPhrase>
<nonTerminalConceptPhrase> : := <quantifier> <nonTerminalConcept>
<nonTerminalConceptPhrase> : := another <nonTerminalConcept>
<nonTerminalConceptPhrase> : := the <definiteReference>
<nonTerminalConceptPhrase> : := the <nonTerminalConcept> <thatClause>
<nonTerminalConceptPhrase> : := the <ordinal> <nonTerminalConcept>
<nonTerminalConceptPhrase> : := the <result> <preposition> <nonTerminalConceptPhrase>
<nonTerminalInstance> : := <instance>
<nonTerminalInstance> : := a (n) <instance>
<nonTerminalInstance> : := the <instance>
<nounPhrase> : := <nonTerminalConceptPhrase>
<nounPhrase> : := <nonTerminalInstance>
<nounPhrase> : := <nounPhrase> * <nounPhrase>
<nounPhrase> : := <nounPhrase> + <nounPhrase>
<nounPhrase> : := <nounPhrase> − <nounPhrase>
<nounPhrase> : := <nounPhrase> / <nounPhrase>
<nounPhrase> : := <nounPhrase> <binaryFunction> <nounPhrase>
<nounPhrase> : := <number> * <nounPhrase>
<nounPhrase> : := <percentage> of <nounPhrase>
<nounPhrase> : := <value>
<nounPhrase> : := the number of <nonTerminalConceptPhrase>
<nounPhrase> : := the product that equals <nounPhrase> * <nounPhrase>
<nounPhrase> : := the quoutient that equals <nounPhrase> / <nounPhrase>
<nounPhrase> : := the total <nonTerminalConcept> <preposition> <nonTerminalConceptPhrase>
<objectPhrase> : := <verbPhrase>
<objectPhrase> : := <verbPhrase> <adjective>
<objectPhrase> : := <verbPhrase> <adjective> <complements>
<objectPhrase> : := <verbPhrase> <complements>
```

-continued

```
<objectPhrase> : :== <verbPhrase> <directObjectPhrase>
<objectPhrase> : :== <verbPhrase> <directObjectPhrase> <complements>
<objectPhrase> : :== <verbPhrase> <directObjectPhrase> <prepositionalPhrase>
<objectPhrase> : :== <verbPhrase> <directObjectPhrase> <prepositionalPhrase> / <complements
<objectPhrase> : :== <verbPhrase> <nounPhrase> <directObjectPhrase>
<objectPhrase> : :== <verbPhrase> <nounPhrase> <directObjectPhrase> <complements>
<ordinal> : :==
<predicate> : :== <objectPhrase>
<predicate> : :== is <adjective>
<predicate> : :== is <nounPhrase>
<predicate> : :== is <preposition> <nounPhrase>
<prepositionalPhrase> : :== <preposition> <nonTerminalConceptPhrase>
<prepositionalPhrase> : :== <preposition> <nounPhrase>
<prepositionalPhrase> : :== <preposition> the <roleName> that is <nounPhrase>
<quantifier> : :== any
<quantifier> : :== every
<quantifier> : :== no
<rule> : :== <actions> if <declaratives>
<rule> : :== if <declaratives> then <actions>
<rule> : :== if <declaratives> then <copularStatement>
<statement> : :== <actions>
<statement> : :== <copularStatement>
<statement> : :== <declarative>
<statement> : :== <rule>
<subjectPhrase> : :== <nounPhrase>
<terminal> : :==
<thatClause> : :== <thatClause> and <thatClause>
<thatClause> : :== that <objectPhrase>
<thatClause> : :== that <predicate>
<value> : :==
<value> : :== <identificationText> <terminal>
<value> : :== <terminal>
<value> : :== <terminal> <identificationText>
<verb> : :== <terminalVerb>
<verbPhrase> : :== <adverb> <verb>
<verbPhrase> : :== <auxiliary> <adverb> <verb>
<verbPhrase> : :== <auxiliary> <verb>
<verbPhrase> : :== <auxiliary> not <adverb> <verb>
<verbPhrase> : :== <auxiliary> not <verb>
<verbPhrase> : :== <modal> <adverb> <verb>
<verbPhrase> : :== <modal> <auxiliary> <adverb> <verb>
<verbPhrase> : :== <modal> <auxiliary> <verb>
<verbPhrase> : :== <modal> <auxiliary> not <adverb> <verb>
<verbPhrase> : :== <modal> <auxiliary> not <verb>
<verbPhrase> : :== <modal> <verb>
<verbPhrase> : :== <modal> not <adverb> <verb>
<verbPhrase> : :== <modal> not <verb>
<verbPhrase> : :== <verb>
<verbPhrase> : :== do/does not <adverb> <verb>
<verbPhrase> : :== do/does not <verb>
<verbPhrase> : :== each and every
<verbPhrase> : :== is not
<verbPhrase> : :== none
```

The preceding grammar is context free in that it does not specify agreement between subject, verb and object phrases, for example. Nor does it specify that singular forms of verbs must be used with singular subjects, that neuter pronouns must be used to refer to neuter subjects or objects, et cetera. Consider, for example, the case that when a customer places an order, it makes no sense for a speech recognizer to allow the verb "places" after an order; however, a context free specification of English grammar could not provide this guidance to the speech recognizer. Consequently, the preferred embodiment determines the grammar to be used by a speech recognizer not simply based upon the context free grammar of a natural language and the limited vocabulary it manages, but based on the syntactic and semantic relationships that it also manages about that vocabulary. Most significantly, the preferred grammar reflects semantic constraints upon syntactic sentences based upon the types of nouns (and their adjectives) that can play certain grammatical roles using various conjugations of verbs (and their adverbs). In the example above, a customer was the subject of the verb "place" expressed in active voice.

In most cases, the grammar produced by the preferred embodiment will not reflect all the semantic constraints of a vocabulary since the number of grammatical rules necessary can grow exponentially. For example, even the syntax of subject-verb-direct object can be quadratic in the number of verbs if the direct object phrase includes an embedded verb phrase.

To the extent that less than all of the semantic constraints are reflected in the grammar provided the speech recognizer, the speech recognizer will have an increased tendency to recognize words, phrases, or sentences that do not form permissible sentences. Consequently, the preferred embodiment of the invention accepts whatever the speech recognizer provides, whether a word, phrase, or sentence, and validates it word by word as if input by a keyboard, terminating when it cannot determine a plausible and permissible extension of the sentence under construction. When integrated within the interface described above, any poorly recognized word can be undone or reversed and statements can be continued using a mouse, keyboard, or speech.

In order to allow a user to speak a fraction of a sentence or a word, but still enjoy the higher recognition rate afforded by continuous speech recognition systems given constraining grammars and many words to recognize, the preferred embodiment will augment its generated grammar with the individual words and phrases, such as verbs following a subject noun phrase, noun phrases for object phrases following a verb, preposition phrases following verbs or object phrases they may complement, and function words such as determiners, pronouns, and others that may occur next grammatically. In this manner, the preferred embodiment allows a user to complete a fully grammatical sentence word-by-word or phrase-by-phrase without being fully constrained by a speech recognizer's demand for dictation of a completely grammatical sentence in a single utterance.

The preferred embodiment will maintain a vocabulary in a manner substantially equivalent to that of electronic dictionaries (including thesauri), albeit with enhanced support for morphological, etymological, phonological, and grammatical information. The preferred embodiment will support an extensible thesaurus where a dictionary definition may be categorized using set of type theoretical relations (e.g., "member", "subset", "disjoint"); to provide an initial set of thesauri categories and relationships between them, such as in Roget's Thesaurus, Princeton's WordNet, and other word classification systems. The dictionary entries may also include detailed parts of speech and semantic information, including but not limited to: singular, plural, collective, or mass forms, gender (e.g., masculine, feminine, neuter.) The dictionary entries may have affiliated information, which may vary by part of speech, such as abbreviations, acronyms, synonyms, antonyms, homonyms, compound words, stems for irregular conjugations or inflections, mood (e.g., for modal auxiliary verbs), case (e.g., for verbs and pronouns in English and determiners in German), gender (e.g., for nouns in German), person (i.e., for pronouns), number (e.g., singular, plural, mass, collective, partitive), gradability including comparative or superlatives forms (i.e., for adjectives), et cetera.

The dictionary of the present invention may include English or other language dictionary entries, which include definitions for parts of speech, such as nouns, verbs, adjectives, etc. The system of the present invention preferably includes an initial vocabulary and syntax for each natural language supported where such initial vocabularies include the function words of a language and any additional words that may be useful in general or in specific application areas. The dictionary of the present invention preferably provides an initial set of dictionary entries for the auxiliary verbs, pronouns, prepositions, articles, connectives, and other particles within English. The system preferably allows permitted users, including users that possess appropriate privileges, to extend such initial vocabularies.

The system of the present invention preferably includes support for an extensible set of copular, intransitive, transitive, and other verb definitions in which the grammatical roles (e.g., indirect object) of the verb definition are identified and whether each such grammatical role is required in every usage of said verb definition, and where the concepts (i.e., noun phrases) that may fill each such grammatical role may be categorized within the thesaurus (e.g., the subject of "owns" is a member of the set of legal entities), and where a grammatical role may have associated preceding or following dictionary definitions (e.g., such as a definition of the preposition "to" preceding the indirect object of the English infinitive "to give"), and where a grammatical role may be identified with a semantic role (e.g., "agent" or "recipient") where such semantic role may be specified by categorization within the thesaurus, for example.

The system of the present invention preferably also has the ability to support an extensible grammar for phrases and sentences in one or more natural languages where the grammar supports agreement between grammatical roles (e.g., "subject") and verbs concerning number, gender, tense; case, the types of nouns expected for various semantic and syntactic roles of verbs, complements, relative clauses, et cetera.

The system of the present invention preferably uses a production rule system to implement and support its extensible grammar in a manner that allows incremental extensions as independent grammar rules that do not need to be positioned among existing grammar rules or merged into procedures that implement existing grammar rules as is the case for any approach other than a production system in which the order of rules is irrelevant. Thus, the system of the present invention is more easily extended than systems of the prior art.

The system of the present invention preferably generates multiple goals recursively through its grammar where such goals correspond to words or non-terminals that can be predicted and optionally presented by a natural language understanding interface. In addition, the system of the present invention preferably uses data-driven processing to recognize input from a natural language understanding interface as satisfying one or more goals where such input may satisfy multiple goals if using speech and words sound similar or if a word has multiple dictionary definitions, such as being both a noun and a verb or having two senses as in hitting in baseball versus boxing.

This is distinct from natural language user interfaces of the prior art in that the present invention can compute its prediction before each input and respond as input occurs without re-computing its predictions after each input and checking the input against each prediction. Thus, the system of the present invention has the distinct advantage that it can provide guidance (i.e., show valid inputs and complete partial inputs as much as possible) before receiving completed input and respond rapidly as input is provided.

The system of the present invention preferably uses a production system based on the Rete Algorithm so that performance of the grammar processing does not degrade significantly as it is extended. The system also preferably uses a version of the Rete Algorithm that has been extended to support backward chaining where goals are automatically generated as in rule languages like Prolog but where goals are represented declaratively (i.e., as data) and non-redundantly such that the normal data-driven processing of the Rete Algorithm recognizes input as matching one or more goals. Thus, the system of the present invention provides real-time interaction with users, graphical interfaces, and speech recognition systems on personal computers where systems of the prior art are typically less than real time.

In sharp contrast to the prior art, the system of the present invention preferably uses production rules that combine syntactic and the semantic constraints. The systems of the prior art separate syntactic processing and semantic processing into different phases of processing. Syntactic specifications in the prior art typically amount to several hundred context free rules plus additional ad hoc code to enforce semantic constraints after receiving syntactic input. The present invention improves upon the prior art by eliminating the combinatorial effort of parsing or generating parses that are syntactically valid but semantically invalid, this being particularly significant for longer sentences and any sentences that use multiple verbs, relative clauses, prepositions, or conjunctions or other connectives, such sentences being quite commonly managed as knowledge. In addition, the present invention improves upon the prior art in that its predictions are semantically valid. The prior art is limited to syntactic plausibility to the extent that its semantic checking presumes a completed input if not a completed syntactic structure as input.

It should be noted that the ability of the present invention to combine syntax and semantics within grammar rules implemented as production rules is preferably based on the Rete Algorithm extended to support goal generation and truth maintenance and the unification of entity/relationship, object role modeling, and procedures described herein. Specifically, the production rules of the present invention rely upon the roles defined in relations in addition to grammatical information of the dictionary entries in order to constrain their processing by all forms of agreement.

The dictionary maintained by the preferred embodiment includes semantic information in addition to the information described above such that the relationships between words are also represented in a manner that enables sentences that are valid from a lexical and syntactic perspective to be identified as semantically invalid or ambiguous. The semantic capabilities of the present invention are beyond that of the prior art in that they are specified conceptually, without requiring prior implementation or being limited to the state of an implementation at a single point in time. That is, the semantic relationships between words defined in the dictionary are preferably not directly tied to implementation details or specifications. The present invention allows the semantic information about words and between words to be defined without any implementation detail. In addition, as implementation details change or become available, a preferred embodiment should allow previously defined words to be related to their initial or refined implementation details.

The semantic information maintained in the dictionary of the preferred embodiment of the present invention should not be limited to modeling data using entity/relationship (ER) or object/role modeling (ORM) as in the prior art, but should preferably extend such modeling capabilities in a unified manner to accommodate modeling of procedural interfaces including arbitrary procedures and methods of member functions of traditional and object-oriented programming languages, for example.

Figure 6:
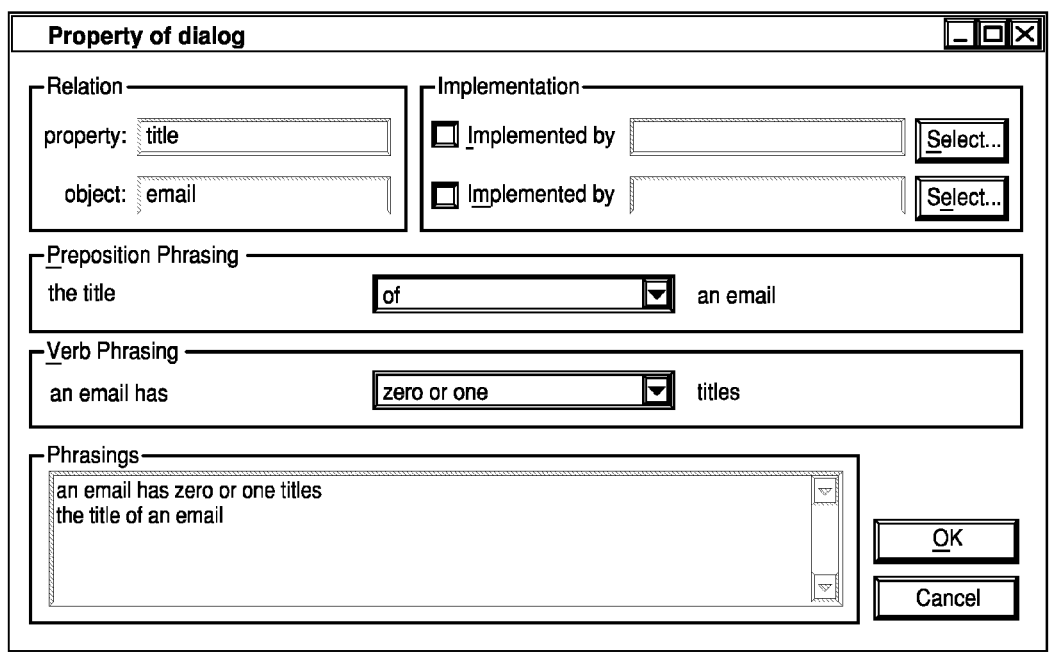
FIG. 6 is a computer screen shot of a dialog box for the implementation of relationships between nouns in accordance with the system of the present invention.

The dictionary of the preferred embodiment of the present invention supports semantic relationships between two nouns without any implementation detail. This is illustrated by the dialog box shown in FIG. 6. The implementation of this relation could be within or between database tables, in an XML file format, by a method returning an as yet undefined data type or collection in Java, et cetera.

Figure 7:
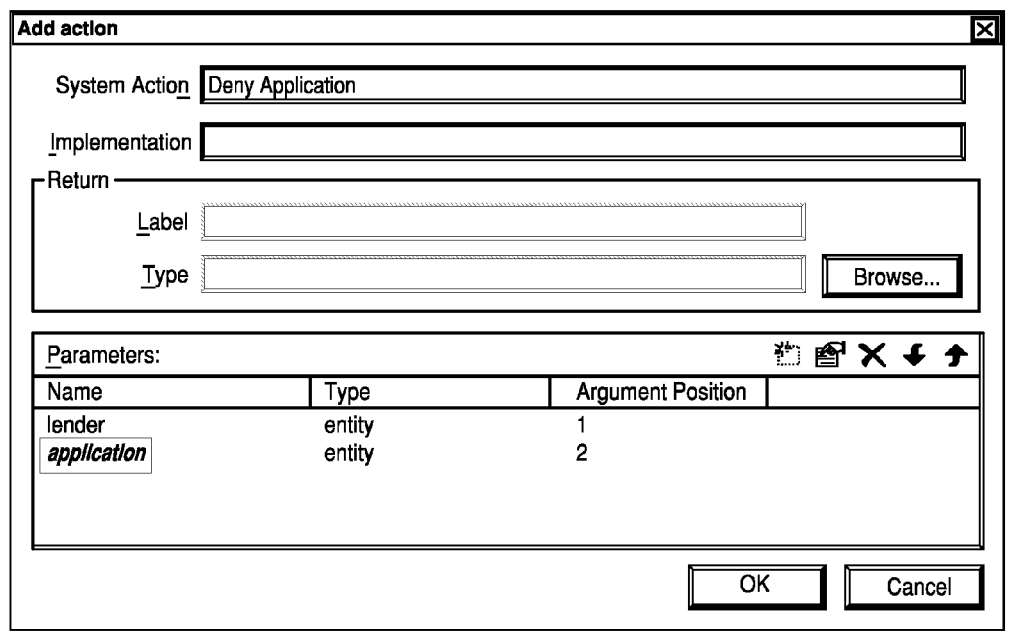
FIG. 7 is a computer screen shot of a dialog box for defining an action in accordance with the system of the present invention.

The dictionary of the present invention preferably supports verbs that do not correspond to relationship between entities in a relational database or objects of different types or classes. For example, the dialog shown in FIG. 7 illustrates the definition of an action rather than a declarative relationship. As shown in FIG. 7, the definition of a action may be, for example, "a lender denies an application". Such an action may not be stored as data but may simply correspond to the transient invocation of a procedure. Thus, modeling within the present invention goes beyond the declarative relational basis of entity relationship or object role modeling.

Figure 8A:
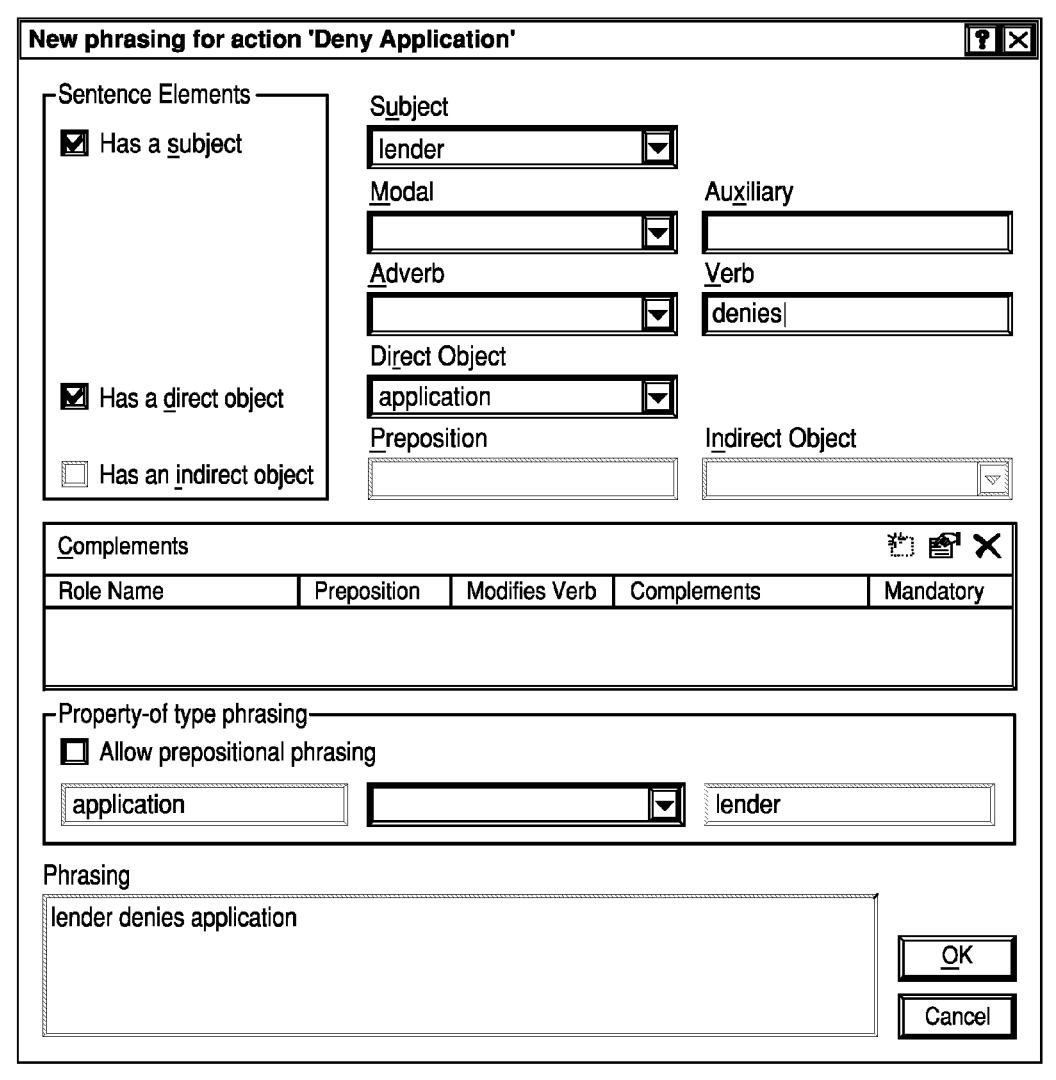
Figure 8B:
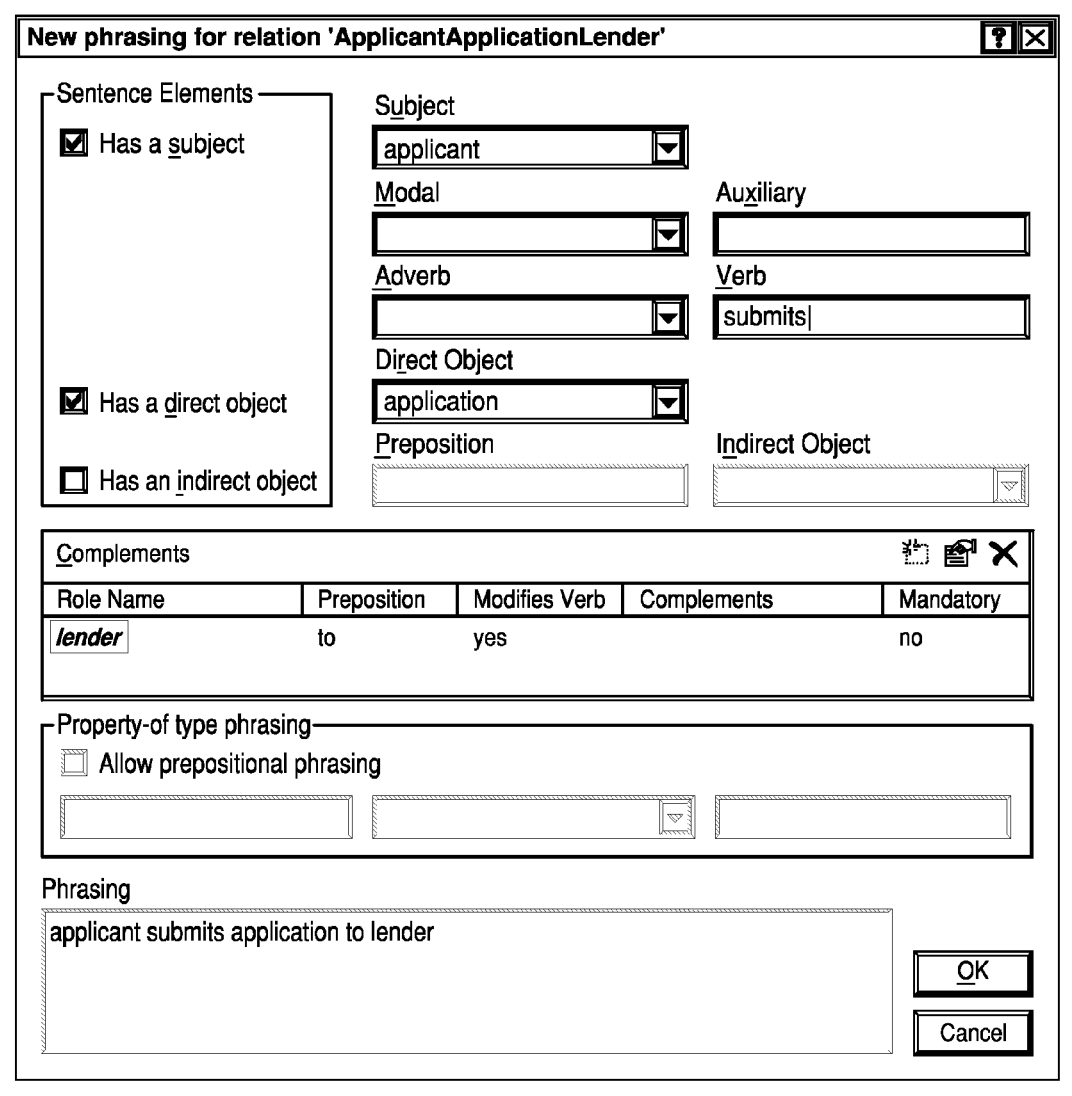

In the present invention, the phrasing of an action or other procedure is specified no differently than a phrasing of a declarative relation. For example, FIGS. 8(*a*) and (*b*) show a dialog box illustrating a declarative relation. This dialog can be used for any relation, declarative or procedural, modeled in the present invention. Thus, the implementation details are not required in order to author sentences and may be changed from declarative to procedural without affecting the use of dictionary words within sentences. In addition, the implementation details of a role may change without affecting the dictionary or statements that use words or phrasing that refer to the changed role.

Figure 9:
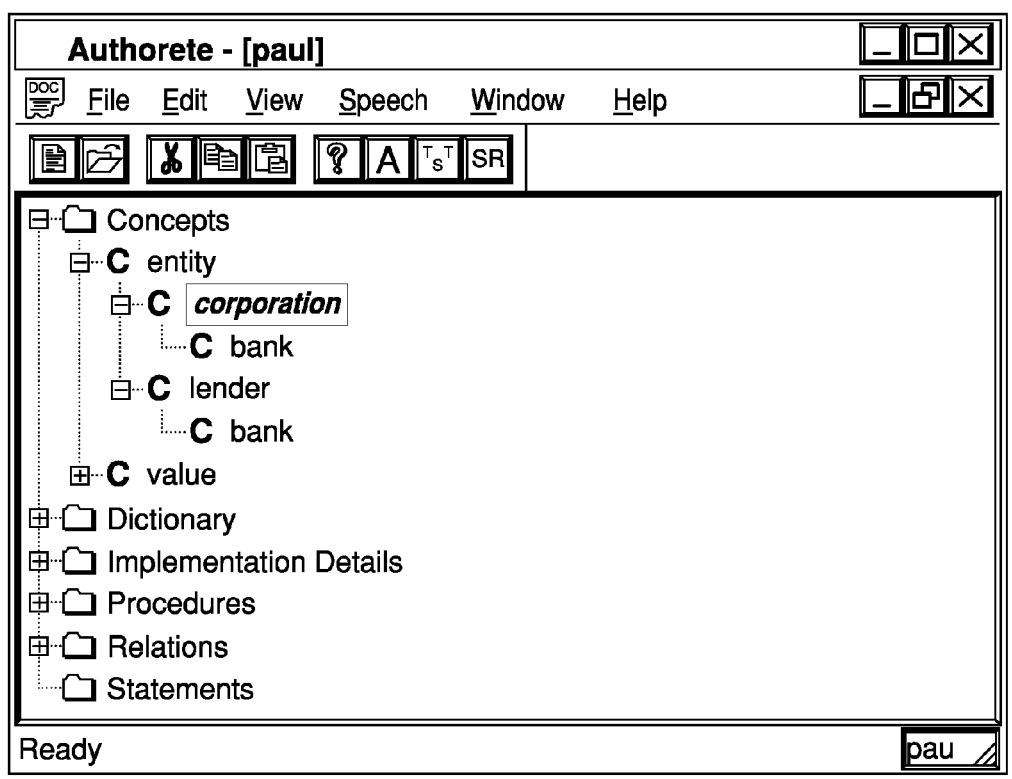
FIG. 9 is a computer screen shot illustrating the ontology of the system of the present invention.

The preferred embodiment of the present invention allows for nouns defined in the dictionary to be organized taxonomically. A specialized noun dictionary entry may inherit certain attributes (e.g., gender, whether or not the noun functions linguistically as an inanimate object and/or as a person), and may fill the roles its parent nouns may play in relations (whether procedural, declarative, or unimplemented) and their phrasings (e.g., as subject, object, or complement of certain verbs). This taxonomy may be presented graphically as an a-cyclic graph or as an outline using a "tree" control, where more general concepts represented by nodes that have specializations (e.g., company generalizes corporation, partnership, etc.); where specific instances of a concept are grouped under the node for that concept (e.g., proper nouns under their concept, such as "Fido" under "dog") (e.g., adjectives under their attributive concept: "male" under "gender"); where concepts organized within an initial ontology, such as distinguishing types from attributes, from concepts, from actions, etc. This is illustrated in FIG. 9.

The preferred embodiment of the present invention allows for specialized nouns to be defined by classification of their parents where such classifications may be identified by combinations of necessary and sufficient conditions expressed as one or more sentences that may be authored, managed, and automated as supported for other knowledge. For example, the distinction between a specialized noun dictionary entry from each of its parent noun dictionary entries (of which there may be zero, one, or more) may also be stated in a sentence using a verb which has a dictionary definition referring to a relation in which the parent noun plays a role. In addition, the natural language user interface of the present invention understands that nouns may be organized taxonomically and allows more specialized nouns to play roles defined as require one of their generalizations.

The preferred embodiment of the present invention provides an extensible ontology of disjoint and root count nouns for "values" and "entities" and further concepts that inherit from "values" for each data type that may fill a column of a database row, a field or a record, or a member datum of an object. This preferably includes entities inheriting directly from "values" for dates & times, strings, Boolean values; and "numbers" including integer and real numbers, percentages, fractions, and numbers of items or amounts of units.

The preferred embodiment of the present invention provides an extensible ontology of units which measure amounts of mass noun quantities such as time, distance, mass, and currency, each of which is a primitive dimension that may be measured on one or more scales where each scale has one or more unit, such as English or metric scales of distance, mass, and time or as in currencies and their various bills and coinage. This ontology is extensible in that additional primitive dimensions can be specified and that new units can be defined by combining primitive exponential dimensions, as in miles per hour being distance divided by time (i.e., $distance^1 * time^{-1} * mass^0 * currency^0$).

The preferred embodiment of the present invention provides a extensible set of arithmetic capabilities and grammar that includes binary arithmetic predicates and functions and phrasings along with deductive implementations that understand that units must agree for addition, subtraction, and comparisons and how to combine units for multiplication, division, et cetera. The agreement and combination of units is understood such that inconsistent statements can be recognized and may be avoided.

All of the forgoing considerations of grammar, inheritance, agreement, are supported in the present invention. Consequently, the present invention has a significant advantage over the prior art.

The knowledge management system of the present invention preferably stores sentences not as parse trees with reference to vocabulary but as relationships and roles of those relationships. The preferred embodiment of the present invention thus separates the semantics of a sentence from the lexicon and syntax used to specify that semantics. Thus, the knowledge management system of the present invention has the distinct advantage over the prior art in that knowledge managed is independent of vocabulary and grammar and even independent of language. Moreover, the knowledge acquisition system of the present invention may allow equivalent meanings through a variety of expression (i.e., different sentences.)

The preferred embodiment of the present invention might render such meanings using any lexicon that is grounded in the relations and roles used in the relationships and roles of those relationships by which the knowledge management system represents the original sentence (provided that the knowledge management system has a grammar for the natural language of the lexicon). The preferred embodiment of the present invention might also have the advantage that it could render a sentence in potentially several different manners in order to effectively communicate, disambiguate, or clarify its interpretation of a sentence. Consequently, a preferred embodiment of the present invention will also have the distinct advantage that it can acquire, translate, and present sentences across multiple natural languages.

Figure 10A:
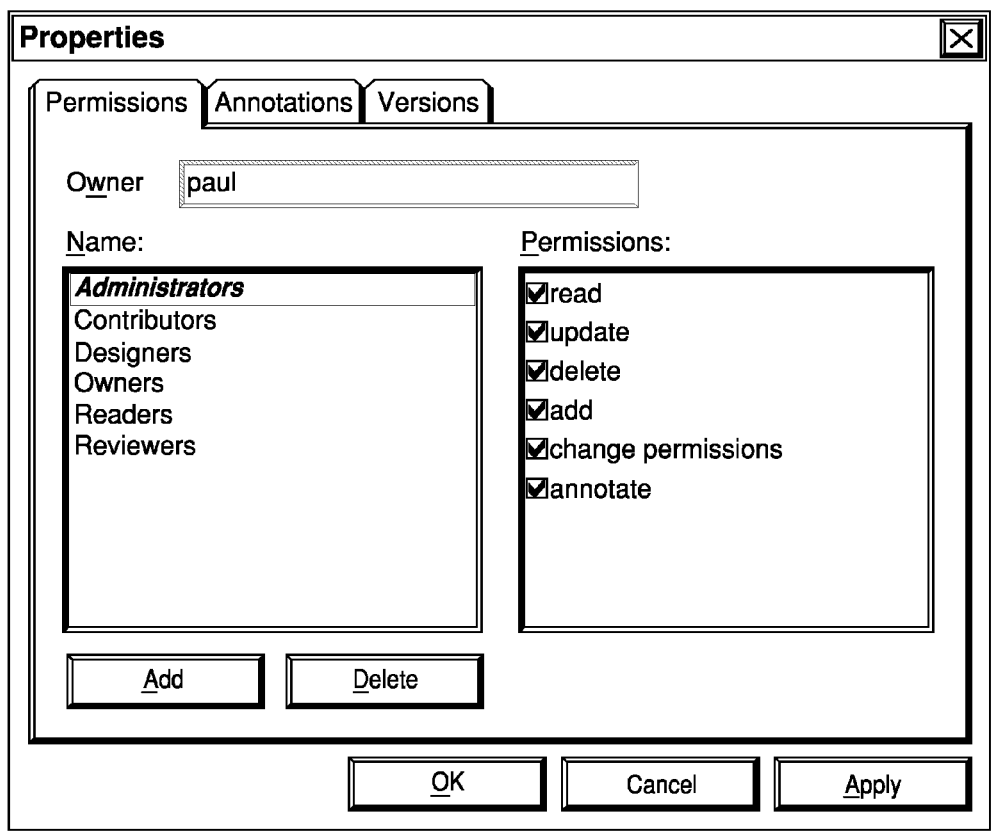
FIGS. 10(a)-(c) are computer screen shots illustrating version maintenance in the system of the present invention.
Figure 10B:
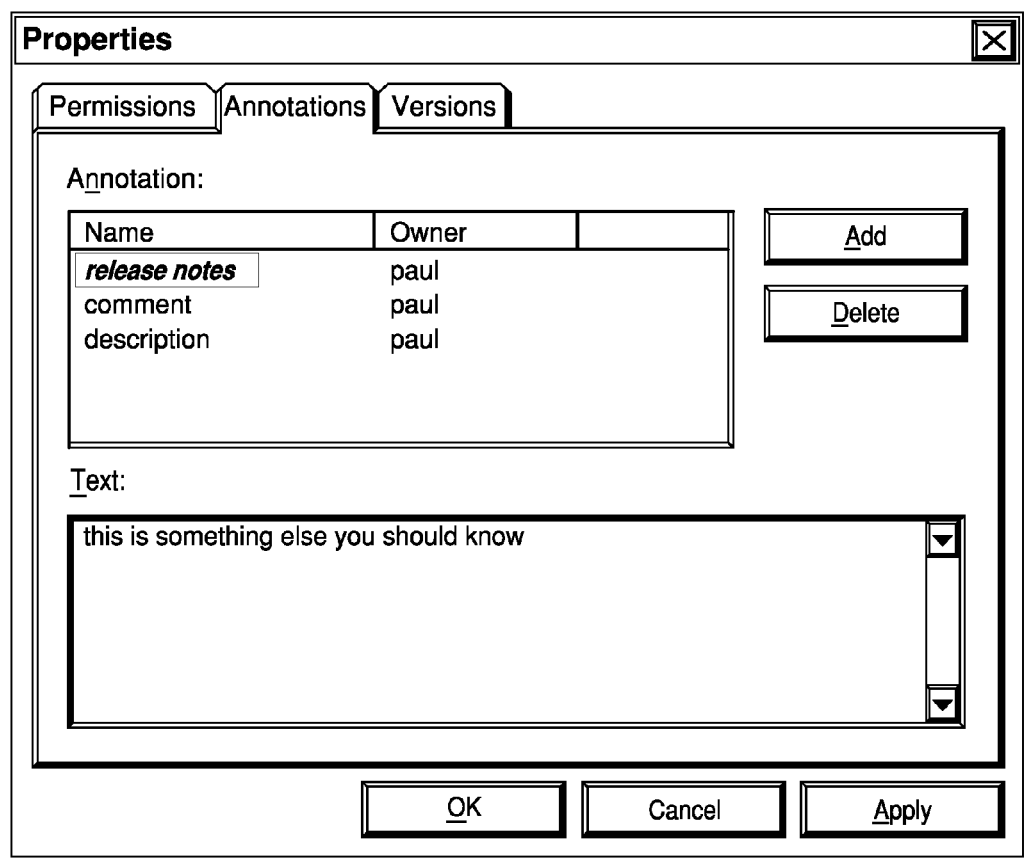
Figure 10C:
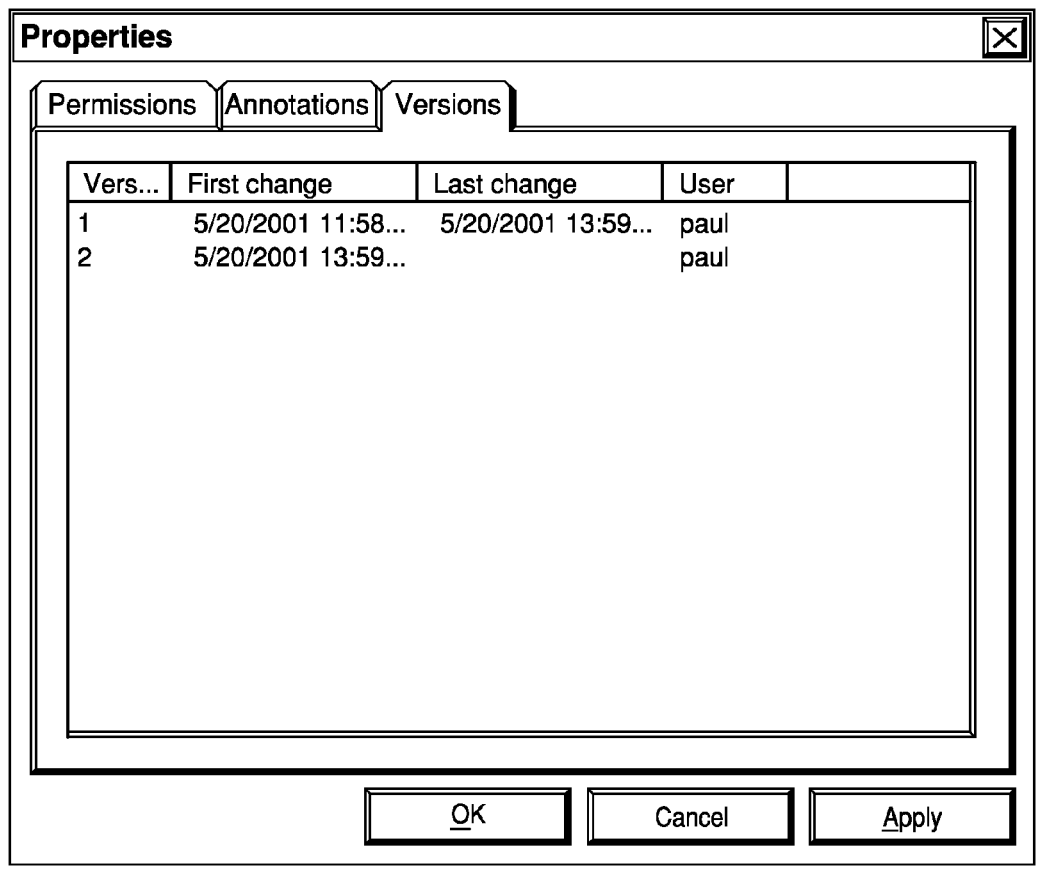

The present invention is also a preferred embodiment in that it provides complete version control for any dictionary entry, relation, phrasing, sentences, templates, attributes, or other objects. That is, the present invention retains the original author of the first version of any such object as well as the user who creates any subsequent versions. The present invention allows the original and each subsequent version to be annotated while it keeps track of author/editor and session information, including time and date: The system preferably does so using applicative methods, such that the original version of any such construct, the sequence of versions of any such construct, and the author or editor for every version of any such construct can be determined. This is illustrated in FIGS. 10(*a*)-(*c*).

The system preferably can be accessed or edited by multiple simultaneous users with optional administration of access and edit privileges in general or on a per object basis using permissions. The system preferably maintains referential integrity and prevents overlapping edits by multiple simultaneous authors including, for example, overlapping edits of relations and their roles or of templates and their attributes.

Figure 11:
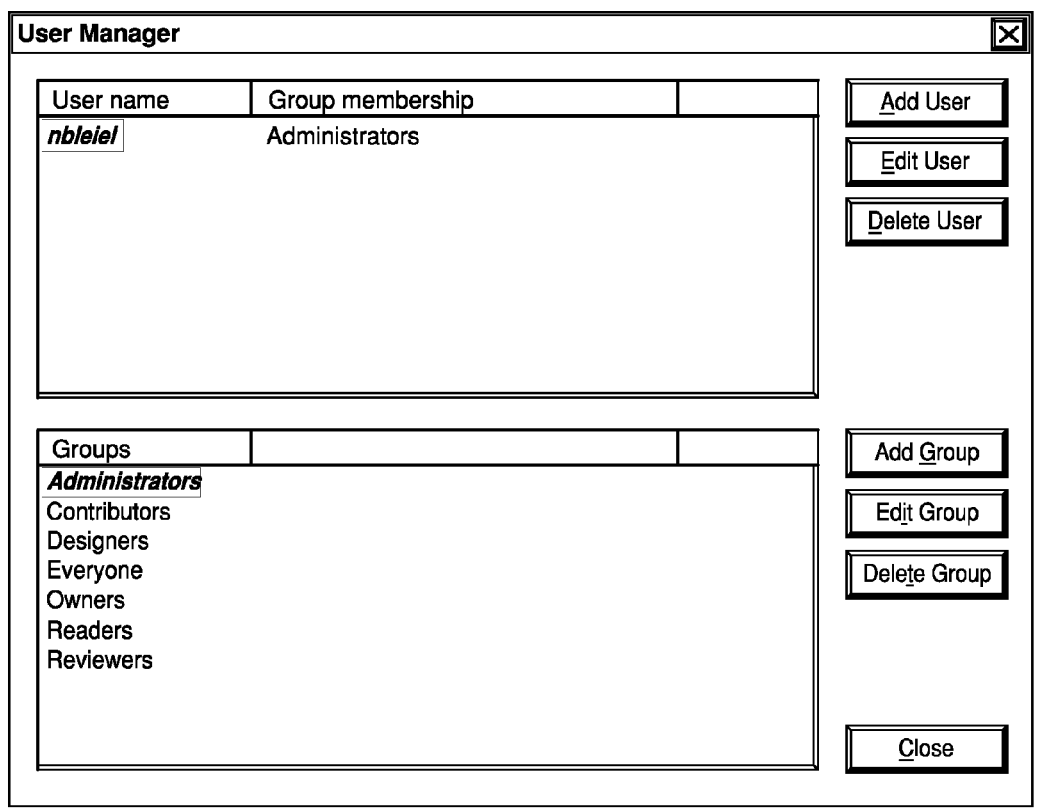
FIG. 11 is a computer screen shot illustrating the user manager of the system of the present invention.

As discussed above, the knowledge management system preferably includes a means of identifying users and administrating privileges and groups while also keeping track of the creators and owners of various objects (e.g., words, phrases, and sentences). In addition, the knowledge management system of the present invention maintains a complete history of all versions of the objects and data in the knowledge base as users modify, augment, and delete its contents. With these capabilities the system can prevent conflicting edits and allows users to operate on the knowledge contained therein at any point in time, with the ability to focus on or exclude versions created by some set of users since a prior point in time. Multiple simultaneous users may modify the knowledge base across an enterprise, allowing it to be shared enterprise-wide. This is illustrated in FIG. 11.

Because of these capabilities, the present invention has the significant advantage over the systems of the prior art that it can manage the specification of knowledge as a set of unambiguous and grammatical sentences using a managed vocabulary. Moreover, the present invention has the significant advantage that it can do so for multiple, simultaneously active users within an enterprise. In addition, the present invention can do so without implementation details and as implementation details change independently of knowledge expressed using implementation independent semantics.

Note that the management of sentences as knowledge by the present invention is in contrast to the prior art in which natural language interfaces are primarily concerned with processing a query or command at the moment it is stated rather than storing a sentence as business knowledge that is to be managed and, perhaps, automated.

The software modeling system of the present invention provides for a mapping between words used in the semantic modeling in which verbs relate nouns and external systems design or implementation details.

With regard to vocabulary, the software modeling system of the present invention preferably supports the entities that may correspond to tables within databases or classes within object models, including those aggregated within other tables or classes; or proper nouns that are specific instances of a conceptual entity and may identify specific rows or instances of tables or classes; or types of data that may be stored within databases or objects; or attributes that entities may possess and that may have a type and that may correspond to columns of database tables or attributes of classes; or values that may occur within cells of rows and columns of a table in a database or as possible values of attributes of objects.

The knowledge acquisition system also preferably supports the dictionary definition of one or more verbs that map to relations between concepts which may correspond to references between tables or classes (e.g. a order includes some products); or references between tables or classes and their aggregated objects (e.g. a person has an address); or relations between concepts and columns of database tables or attributes (e.g., a person was born on a birth date, a person has a gender); or actions that may be performed where an action may have optional or mandatory roles (e.g., an action may require a subject or a direct or indirect object); or an action may be performed by the system (e.g., if the action requires no subject) or an agent (e.g., if the action is a method of an agent class); or an action may correspond to a procedural language routine where roles of the action correspond to parameters that may be required by the routine; or functions, as a special case of actions, where the result returned from a routine also plays a role in the relation corresponding to the function; or Predicates, as a special case of functions, where the result returned from a function is interpreted as a Boolean value (i.e., true or false).

The software modeling system of present invention supports the creation, modification, and deletion of "templates" and "attributes" where templates may inherit from generalizations and be presented by a user interface and where a template may correspond to a relational database table, object, an XML entity, an object-oriented class, et cetera and an attribute may correspond to a column, attribute or sub-entity, or member datum or access method of each, respectively. Nouns representing entities may be implemented by templates and, thereby, by relational database tables, XML entities, object-oriented classes, et cetera. Nouns representing values may be implemented by attributes where they play a role in a relation. The present invention may also ensure referential integrity between roles and attributes (e.g., different roles of declarative relations are implemented by different attributes), between templates and entities (e.g., an template cannot implement a concept that has a generalization that is implemented by a second template that is not a generalization of the first template.), and between templates and attributes (i.e., attributes cannot reference undefined templates and deleting a template also deletes all its attributes). This is illustrated in FIG. 12.

The preferred embodiment of the present invention enforces referential integrity between concepts and roles (i.e., roles cannot reference undefined concepts and concepts cannot be deleted while referencing roles exist) and roles and relations (i.e., roles cannot reference undefined relations and deleting a relation also deletes all its roles).

The present invention supports the interactive specification or automatic acquisition of external "data types" (i.e., other than those discussed above which are provided as built-in kinds of values, such as numbers) and "procedures", including object-oriented classes or interfaces and their member functions (e.g., as in Java, COM, CORBA, or C++).

The present invention may incorporate procedures in addition to data by distinguishing declarative relations from procedural relations, where the roles of declarative relations may correspond to attributes, as described above, and procedural relations are implemented by a named procedure. The named procedure may be resolved at compile, link, load, or run time from a designated library, may be actions performed on a class of objects or by a class of agents, or may be global or specific to a designated class of objects.

Figure 13:
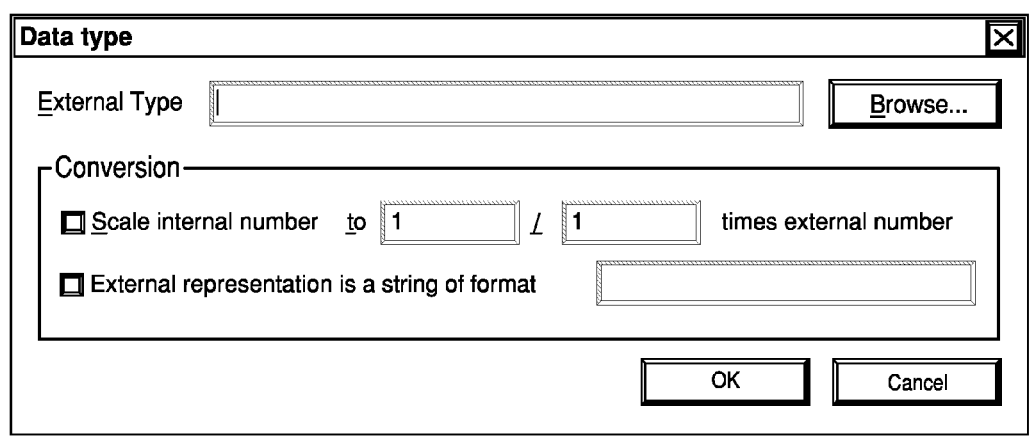
FIG. 13 is a computer screen shot the designation of roles of procedural relations in the system of the present invention.

The roles of procedural relations may correspond to parameters of a procedure, where a role has a data type that may be convert to or from a value by combinations of numeric scaling and string processing, one role may be designated as that of the "result" for a function, the "result" role of a predicate uses the built-in concept of a Boolean value, and the order of parameters is reflected in an ordering of roles. This is illustrated in FIG. 13.

The same scaling and formatting applied between roles and data types of external procedures may be applied between attributes and procedural access function (e.g., "get" methods), public member data, and database column types.

In sharp contrast to the prior art, the system of the present invention has the ability to describe computer programs using natural language, which is particularly beneficial to non-technical business personnel who manage businesses that utilize the programs so described. Such usage of natural language provides greater control over the implementation of computer programs to business people with lower implementation and maintenance costs. Thus, using a natural language system to specify knowledge that becomes active within decision support and other information systems provides distinct advantages.

Also in sharp contrast to the prior art, the system of the present invention is a knowledge management system that understands the precise word senses and grammatical structure of the sentences it maintains, with support for multiple users and version control including owner and editor tracking with administration of privileges and permissions that allows the documentation of business practices, policies, and regulations to be managed with the same rigor used to implement computer software; and for contributions to be made and content to be viewed in any of several natural languages.

The system of the present invention also preferably includes an initial grammar and vocabulary for one or more natural languages; allows people to define new words using on-screen forms or natural language statements; allows people to express knowledge as natural language declarative statements; allows people to express action using natural language imperative statements; parses statements into a language independent representation that relates their clausal and phrasal structure to specific language independent word senses; allows people to organize concrete or abstract, common or proper, singular or plural, and other nouns within subtype, subset, and membership taxonomies through on-screen interfaces or natural language statements; allows people to specify various active or passive, transitive or intransitive, and other usages of verbs and their grammatical and semantic roles; and allows natural language statements to be expressed using text or spoken language.

The knowledge acquisition system of the present invention specifically accommodates business knowledge, policies and practices preferably by providing for mappings between words and the content and structure of object-oriented or relational business models; or by acquiring mappings between words and business models by importing standard object-oriented and relational database systems; or by providing for mappings between words and programming interfaces, such as predicates, functions, procedures, or object-oriented methods; or by acquiring mappings between words and business processes by importing standard application programming interface (API) definitions, including standard object-oriented interface definition languages (IDL), and other data or content specifications such as may be expressed in Unified Modeling Language (UML), extensible Markup Language (XML), Structure Query Language (SQL), et cetera.

The knowledge automation system of the present invention preferably may generate code for one or more statements in the knowledge management system. The code generated for statements may vary from rules that hypothesize decision outcomes, to evaluation criteria that aggregate some type of score, to SQL statements that query or manipulate a database, et cetera. Any statement that uses roles that are implemented may be automated in some fashion by the present invention since, in the course of acquiring a sentence, the present invention understands which of its relationships are conditions, actions, implications, or definitions. Consequently, the present invention can generate code that examines objects, databases, XML content, et cetera and that invokes procedures such as member functions to check conditions and depending on the outcome of those checks invoke member functions or manipulate data or content according to the actions or implications of a sentence. Thus, the present invention has a significant advantage over the prior art, which can only perform limited query and update against databases. Moreover, the prior art is limited to the state of an implementation at the moment of query, not as implemented in the past or as to be implemented in the future according to a design.

The knowledge automation system of the present invention preferably may generate production rules for one or more statements. The implementation of such statements as production rules effectively implements such statements as business policies. In addition, the system may generate additional code, such as additional rules, procedural code, or SQL statements, which integrate external information, such as object models, databases, or XML content, with the production rules generated for statements. The present invention thus can generate a production system that implements large numbers of policies, regulations, and other rules in a manner that effectively automates or supports a business process, such as in decision support. The ability of the present invention to automate business process defined as a collection of sentences is a significant advantage over the prior art, which has been limited to interactive query and update rather than persistent source code for production use.

Although the production rules of the present invention can be generated as triggers within SQL databases (i.e., stored procedures) or object-oriented classes, the present invention preferably generates code for statements as production rules that are implemented using the Rete Algorithm. In this manner, the present invention allows business processes, such as in decision making, to be defined initially by hundreds growing to thousands of statements without encountering any substantial performance degradation in production use.

Figure 14:
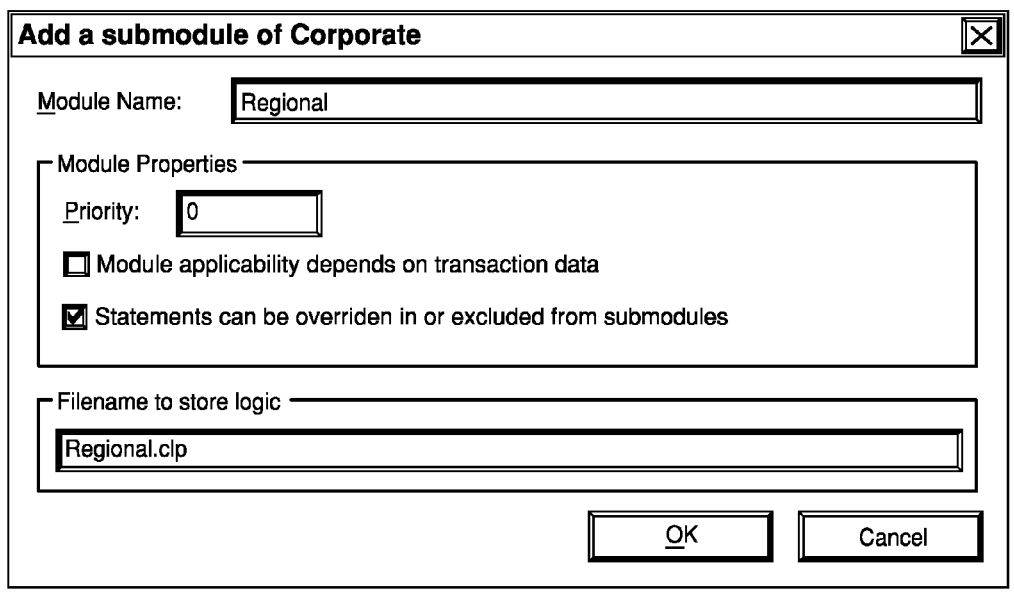
FIG. 14 is a computer screen shot illustrating the taxonomy of modules of the system of the present invention.

The present invention preferably generates production rules for a version Rete Algorithm extended to support backward chaining. In this manner, the present invention can allow statements to identify data required in a way that allows the production system to acquire information from external databases, procedures, or objects on an as-needed basis, which can be a more efficient approach than providing all possibly relevant information, such as when rules execute "in process" with an object model or "close" to a database. The knowledge acquisition system of the present invention allows statements to be organized within a taxonomy of "modules", which may be assigned relative priorities or subjected to control from procedural control. The ability to group statements and control the execution of groups of modules allows more complex business processes to be automated as collections of statements. For example, a complex business process may require that decisions be made in a certain order, such as deciding not to make an offer before determining what price to offer. Alternatively, statements may correspond to business policies within an organization with some being default and others being firm and not subject to overrides. For example, a corporate business policy may or may not be overridden at a regional or branch level. This is illustrated in FIG. 14.

The present invention preferably generates production rules for a version of the Rete Algorithm that supports such modular organization of production rules. In addition, the present invention may generate production rules in a manner that allows transaction data to determine the applicability of a module such that statements in an applicable module may effectively override statements from superior modules and that statements from superior modules may be excluded without overrides as appropriate. Thus, the present invention has a significant advantage on the prior art in that rules may be overridden or excluded in certain cases and that statements of business knowledge may explicitly be authored and managed by groups corresponding to decisions or organization structures where statements in such groups may be overridden or have exceptions, all of which is beyond the prior art.

The present invention preferably dates and times at which a statement is to become effective or expire and generates production rules for a version of the Rete Algorithm extended to maintain such times and dates such that statements become effective or expire at the times and dates specified. In this manner, the present invention advances the state of the art by allowing arbitrary business policies defined in natural language to go into or out of effect without affecting operational systems. In the prior art, only simple rules could be reflected in tables that might have effective/expiration times, but arbitrary business policies with effective and expiration times would need to be coded manually and any change would require a production software release cycle. In the event that a production rule system that supported effective/expiration times was in use, programmers trained in the technical rule language would still be involved and a production software release might still be involved.

The present invention preferably maintains a statement id across versions of a statement and generates production rules for a version of the Rete Algorithm extended with an audit callback that can receive the id of a statement for the purpose of logging the application of a statement at a time and perhaps to a case or transaction being processed. Thus, the present invention advances the state of the art by optionally providing accountability at the level of sentences, a capability which is impractical using the prior art despite the ability of certain production rule systems to audit execution at the level of rules (i.e., there is no formal relationship as between a knowledge management system for business policies and a source code control system for production rule source code). Moreover, the knowledge automation system of the present invention supports the use of such audit capabilities to run test cases and maintain a history of such cases such that the effect of changes in statements can shown for individual and across cases. Thus, the present invention advances the state of the art by providing a regression test capability for business processes defined at the level of sentences rather than for code expressed in programming languages.

Although this invention has been described with reference to particular embodiments, it will be appreciated that many variations may be resorted to without departing from the spirit and scope of this invention. For example, the information represented by the query engine as herein described may be stored in a plurality of relational databases, or could even be stored in some other temporary or permanent memory system, such as RAM, EEPROMs, etc., and is not particularly limited. The software system of the present invention may be adapted to operate on any software platform, such as Microsoft Windows, various versions of UNIX, Apple Macintosh, and is also not particularly limited.

I claim:

1. A computer-based enterprise knowledge management system that represents and stores business knowledge in a natural language and generates program source code or rules to implement said business knowledge for use in business practices, comprising:

at least one user interface for receiving said business knowledge in one or more sentences in a natural language;

at least one user interface interactively presenting one or more statements from a knowledge manager and one or more production rules from a generator to the user via the user interface;

at least one computer-readable memory, containing:

(a) said knowledge manager programmed to represent said business knowledge as said at least one statement comprising at least one relationship, said relationship instantiating at least one relation having at least one role and at least one concept filling said role, wherein the relationships are defined using semantic modeling, wherein said representation of said business knowledge is accomplished using the Rete algorithm; and (b) said knowledge manager programmed to process said relationships semantically and syntactically;

(c) said generator in communication with said knowledge manager to generate computer program code or production rules that combine syntactic and semantic constraints for implementing said business knowledge; and at least one tangible computer-readable storage medium selected from the group consisting of a temporary memory system and a permanent memory system for storing said statement and said computer program code or production rules to be integrated with external object models and databases.

2. The system of claim 1, wherein said concept comprises one or more selected from the group consisting of common or proper, number, gender.

3. The system of claim 1, wherein said concept may include other concepts.

4. The system of claim 1, wherein said relation comprises a plurality of roles, and wherein each of said roles identifies a concept.

5. The system of claim 4, wherein each of said roles is designated as mandatory or optional.

6. The system of claim 1, wherein each of said roles specifies one relationship for each of said concepts filling said role.

7. The system of claim 1, wherein said concept is an entity.

8. The system of claim 7, wherein said entity has an inherent value selected from the group consisting of integers, real numbers, dates, times, Boolean values, and strings.

9. The system of claim 8, wherein said value comprises an amount, defined by a predetermined scale having multiple units, measured along at least one dimension.

10. The system of claim 9, wherein said scale comprises one or more selected from the group consisting of Metric and English.

11. The system of claim 9, wherein one of said units is defined as another of said units raised to a power.

12. The system of claim 1, wherein said business knowledge comprises at least one procedure having at least one input parameter and at least one output value, and wherein each of a plurality of said roles is mapped to said input parameter and said output value.

13. The system of claim 12, wherein said mapping includes a fractional scaling or string formatting to be applied to at least one of said input parameter and said output value.

14. The system of claim 12, wherein said statement comprises text in the syntax of a programming language.

15. The system of claim 14, wherein said knowledge manager is programmed to generate at least one SQL query.

16. The system of claim 12, wherein said procedure comprises one or more selected from the group consisting of object-oriented classes and program interfaces.

17. The system of claim 1, wherein said relation is a template having at least one attribute defining said role, wherein said template is defined by a relational database having at least one table having at least one column therein, and wherein said attribute is defined by said column.

18. The system of claim 17, wherein said template defines an XML tag having at least one parameter, and wherein said attribute defines said parameter of said XML tag.

19. The system of claim 1, wherein said relation is a template having at least one attribute defining said role, wherein said template is defined by an object-oriented class having at least one member datum, and wherein said attribute is defined by said member datum.

20. The system of claim 1, wherein said statement is at least one grammatical sentence and wherein said role defines a noun and said relation defines a verb in said grammatical sentence.

21. The system of claim 20, wherein said verb, as used in said relation, comprises one or more selected from the group consisting of active, passive, and linking.

22. The system of claim 20, wherein said noun, as used in said role, comprises one or more selected from the group consisting of subject, direct object, indirect object, and noun phrases.

23. The system of claim 20, wherein said grammatical sentence is in the English language.

24. The system of claim 20, wherein said grammatical sentence is created interactively using said interface.

25. The system of claim 24, wherein said interface is programmed to accomplish said interactive creation using at least one tree, and wherein said tree branches on at least one of said concepts filling said roles.

26. The system of claim 24, wherein said interface is programmed to accomplish said interactive creation using at least one menu, and wherein said menu is divided into a sub menu on at least one of said concepts filling said roles.

27. The system of claim 24, wherein said interface further comprises a speech synthesizer programmed to synthesize speech based upon said received business knowledge.

28. The system of claim 20, wherein said grammatical sentence comprises arithmetical operators and comparisons.

29. The system of claim 1, wherein said interface is programmed to receive said business knowledge using one or more selected from the group consisting of voice recognition, keyboard input, and computer pointing device selection.

30. The system of claim 1, further comprising a version control manager programmed to control one or more selected from the group consisting of changes to said statement, relation, roles, or concepts; users of said system; association of said users into groups; actions of said users; access of said users to said system; and privileges of said users.

31. The system of claim 30, wherein said version control manager is further programmed to generate a report based upon one or more selected from the group consisting of said changes, said users of said system, said association of said users into groups, said actions of said users, said access of said users to said system; or said privileges of said users.

32. The system of claim 1, wherein said knowledge manager is programmed to generate at least one production rule from said statement.

33. A computer-based method for managing business knowledge by representing and storing business knowledge in one or more sentences in a natural language and automatically generating program code or production rules to implement said business knowledge for use in business practices, comprising:

receiving business knowledge in a natural language into a computer through a user interface;

representing said business knowledge as at least one statement comprising at least one relationship, said relationship instantiating at least one relation having at least one role and at least one concept filling said role;

storing said statement;

generating, from said statement, computer program code or rules implementing said business knowledge, wherein syntactic and semantic constraints are processed simultaneously; and storing said computer program code or rules selected from the group consisting of a temporary memory system and a permanent memory system for implementing said business knowledge.

* * * * *

UNITED STATES PATENT AND TRADEMARK OFFICE
CERTIFICATE OF CORRECTION

PATENT NO. : 7,606,782 B2  Page 1 of 1
APPLICATION NO. : 10/296114
DATED : October 20, 2009
INVENTOR(S) : Paul Haley It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 573 days.

Signed and Sealed this

Fourteenth Day of December, 2010

David J. Kappos
*Director of the United States Patent and Trademark Office*